US010993084B2

(12) United States Patent
Macrae

(10) Patent No.: US 10,993,084 B2
(45) Date of Patent: Apr. 27, 2021

(54) PORTABLE SERVER FOR WIRELESS CONTENT DISTRIBUTION WITHIN A LOCAL AREA

(71) Applicant: Bluebox Aviation Systems Ltd, Dunfermline (GB)

(72) Inventor: James Macrae, Dunfermline (GB)

(73) Assignee: BLUEBOX AVIATION SYSTEMS LTD, Fife (GB)

( * ) Notice: Subject to any disclaimer, the term of this patent is extended or adjusted under 35 U.S.C. 154(b) by 0 days.

(21) Appl. No.: 16/498,363

(22) PCT Filed: Mar. 29, 2018

(86) PCT No.: PCT/GB2018/050860
§ 371 (c)(1),
(2) Date: Sep. 26, 2019

(87) PCT Pub. No.: WO2018/178704
PCT Pub. Date: Oct. 4, 2018

(65) Prior Publication Data
US 2020/0068358 A1  Feb. 27, 2020

(30) Foreign Application Priority Data
Mar. 31, 2017 (GB) ..................................... 1705230

(51) Int. Cl.
*H04W 4/06* (2009.01)
*B64D 11/00* (2006.01)
(Continued)

(52) U.S. Cl.
CPC ......... *H04W 4/06* (2013.01); *B64D 11/00155* (2014.12); *G06F 21/105* (2013.01);
(Continued)

(58) Field of Classification Search
CPC .. B64D 11/00155; H04N 21/214; H04W 4/06
See application file for complete search history.

(56) References Cited

U.S. PATENT DOCUMENTS 9,210,450 B2 * 12/2015 Healy ................. H04N 21/632
9,355,396 B1 *  5/2016 Alkasimi ............ G06Q 20/204
(Continued)

FOREIGN PATENT DOCUMENTS

EP        2569764        3/2013

OTHER PUBLICATIONS

International Preliminary Report on Patentability and Written Opinion dated Oct. 10, 2019 in PCT/GB2018/050860.
(Continued)

*Primary Examiner* — Devan A Sandiford
(74) *Attorney, Agent, or Firm* — Snell & Wilmer L.L.P.

(57) ABSTRACT

A portable server is configured for storing content and for wireless communication with one or more clients for the wireless distribution of at least some of the stored content to one or more of the clients. The portable server is configured for wireless communication with at least one other portable server for use in providing a system for wirelessly distributing content to a plurality of clients in a local area such as a building or a vehicle and, in particular though not exclusively, an aircraft.

19 Claims, 10 Drawing Sheets

(51) Int. Cl.
- *H04W 4/38* (2018.01)
- *H04W 4/42* (2018.01)
- *H04W 4/50* (2018.01)
- *G06F 21/10* (2013.01)
- *G06Q 30/02* (2012.01)
- *H04W 12/03* (2021.01)
- *H04W 84/12* (2009.01)
- *H04W 88/08* (2009.01)

(52) U.S. Cl.
CPC .......... *G06Q 30/0277* (2013.01); *H04W 4/38* (2018.02); *H04W 4/42* (2018.02); *H04W 4/50* (2018.02); *H04W 12/03* (2021.01); *G06F 2221/0768* (2013.01); *H04W 84/12* (2013.01); *H04W 88/08* (2013.01)

(56) References Cited

U.S. PATENT DOCUMENTS

| | | | | |
|---|---|---|---|---|
| 10,644,785 | B2* | 5/2020 | Hansen | H04N 21/2146 |
| 2005/0037787 | A1* | 2/2005 | Bachner, III | H04L 67/1095 |
| | | | | 455/502 |
| 2007/0255632 | A1* | 11/2007 | Hatano | G06Q 30/06 |
| | | | | 705/28 |
| 2013/0254308 | A1* | 9/2013 | Rose et al. | H04N 21/252 |
| | | | | 709/206 |
| 2014/0013365 | A1* | 1/2014 | Ezaki | H04N 21/2146 |
| | | | | 725/77 |
| 2014/0024395 | A1* | 1/2014 | Johnson | H04W 4/00 |
| | | | | 455/456.3 |
| 2014/0282038 | A1 | 9/2014 | Royster | |
| 2015/0150061 | A1* | 5/2015 | Bleacher | H04N 21/26258 |
| | | | | 725/76 |
| 2016/0134920 | A1 | 5/2016 | Bleacher | |
| 2016/0285542 | A1* | 9/2016 | Du | B64D 11/0015 |
| 2017/0310543 | A1* | 10/2017 | Greig | H04N 21/2146 |
| 2018/0115609 | A1* | 4/2018 | Dusik | H04L 67/12 |
| 2018/0123679 | A1* | 5/2018 | Hansen | H04B 7/18506 |
| 2018/0288465 | A1* | 10/2018 | Jarvis | H04N 21/431 |
| 2019/0208114 | A1* | 7/2019 | Ginat | H04N 19/167 |
| 2019/0355265 | A1* | 11/2019 | Maddanimath | G08G 5/0021 |
| 2019/0362638 | A1* | 11/2019 | Donhoffner | G08G 5/0021 |
| 2020/0068358 | A1* | 2/2020 | Macrae | H04N 21/42202 |
| 2020/0091995 | A1* | 3/2020 | Axmon | H04W 84/06 |

OTHER PUBLICATIONS

International Search Report and Written Opinion dated Oct. 4, 2018 in PCT/GB2018/050860.

* cited by examiner

PORTABLE SERVER FOR WIRELESS CONTENT DISTRIBUTION WITHIN A LOCAL AREA

CROSS-REFERENCE TO RELATED APPLICATIONS

This application is U.S. national phase filing under 35 U.S.C. § 371 of PCT/GB2018/050860 (the "860 application") filed on Mar. 29, 2018 and titled, "Wireless Content Distribution." The '860 application claims priority from the Great Britain Application No. 1705230.9 filed Mar. 31, 2017 and titled, "Wireless Content Distribution." Both of the aforementioned applications are incorporated herein by reference in their entireties for all purposes.

FIELD

The present invention relates to a wireless content distribution system and method for providing content such as visual content, web content, video content, audio content, games, services, information and/or advertising content to clients in a local area and, in particular though not exclusively, to a wireless content distribution system and method for providing content to passengers in a vehicle such as an aircraft.

BACKGROUND

The provision of content distribution systems that provide in-flight entertainment to passengers have become increasingly important to airlines, as the choice of content available to passengers and the performance and reliability of such systems has a significant impact on the passenger's enjoyment of a flight and consequently has become an important factor for passengers in selecting an airline or flight.

Known aircraft content distribution systems comprise individual display units at each seat linked by wired network connections (for example via Ethernet connections) to a central server that stores all content available to passengers. An application running at the server provides menus of available content to each user, from which the user is able to select a piece of content to play. The selected content is then streamed in real time from the server to the user's display unit. Such known systems require powerful servers, and high bandwidth network connections that are able to distribute different content to every passenger on the aircraft simultaneously. The requirement for powerful servers and high bandwidth wired connections to each seat add significantly to the weight of the aircraft, which has significant cost and operational implications. Furthermore, as such systems form an integral part of the aircraft they must comply with high safety certification requirements.

Alternative known aircraft content distribution systems stream content from the server to the display devices via wireless rather than wired network connections. However, wireless connections within aircraft can be unreliable due to the geometry of the aircraft, and signal reflection and cancellation effects within the confined space of the aircraft cabin. In order to address such issues, the power of the wireless transmissions may be increased, but it is difficult to scale such systems up for use in larger aircraft without power requirements becoming unfeasibly large. Furthermore, such known wireless systems are usually integrated with other aircraft systems, for example passenger service systems, and again must comply with high safety certification requirements One reason for integrating known aircraft content distribution systems with other aircraft systems, for example passenger service systems, and also for using a central server to stream content in real time, is to ensure that the cabin staff can control the streaming of content to the passengers, and can halt or pause the playing of content for instance in an emergency or to enable delivery messages over an intercom system. Installation and maintenance of such systems can be complex and expensive.

SUMMARY

It should be understood that any one or more of the features of the following aspects or embodiments of the present invention may apply alone or in any combination in relation to any of the other following aspects or embodiments of the present invention.

According to an aspect or an embodiment of the present invention there is provided a portable server for use in a system for wirelessly distributing content to a plurality of clients in a local area, wherein the portable server is configured for storing content, the portable server is configured for wireless communication with one or more of the clients for wireless distribution of at least some of the stored content to one or more of the clients, and the portable server is configured for wireless communication with at least one other portable server.

The portable server may comprise storage for storing content. The portable server may comprise a wireless transceiver for wireless communication with one or more of the clients and the at least one other portable server. The portable server may comprise a processor for controlling the wireless transceiver for wireless distribution of content to the one or more of the clients and for wireless communication with the at least one other portable server.

Each client may comprise a computing device of any kind. Each client may have or run an operating system of any kind e.g. Apple iOS, Apple Mac OS, Windows, Linux or the like. Each client may comprise a mobile device associated with and/or operated by a user. For example, each mobile device may comprise a smartphone, a tablet and/or a laptop. Each mobile device may comprise an Apple iOS device, an Android device, an Apple MacBook, a laptop running Windows or Linux, and/or a device with an HTML5 compliant browser. Each client may comprise a personal computer (PC). Each client may include software such as an app or an internet browser to permit the user to communicate with, and select content stored on, the portable server and to permit the user to view and/or listen to the content. Each user may download the software from the internet to the corresponding client in advance of entering the local area in which the system is installed. Alternatively, the software may be provided with an operating system of the client or bundled with OEM software.

The portable system does not require any dedicated or fixed client devices to be provided or to be permanently installed in the local area for each user to permit each user to select, view and/or listen to content. The system is designed for use in a Bring Your Own Device (BYOD) model. The BYOD model allows users to use their own compatible mobile devices to access the system: iOS, Android, PC or Mac. Users' own mobile devices are allowed to join the network so that each user may browse, view and/or listen to content. The portable server may define a portable system for wirelessly distributing content to the plurality of clients in the local area.

The portable server and at least one other portable server may together define a portable system for wirelessly distributing content to the plurality of clients in the local area. Each portable server may be configured for wireless communication with one or more corresponding clients so that the portable system may distribute content to the plurality of clients in the local area.

The portable system may be configured for occasional connection to the internet.

The portable system may be configured to deliver content to the plurality of clients when the portable system has no connection, or no access, to the internet. The portable system may be configured to allow the content to be updated and/or changed when the portable system has a connection, or access, to the internet.

The local area may be a defined space or region and the clients may be located within the defined space or region. For example, the local area may be defined by or within a building and the clients may be located in, around or adjacent to the building. The local area may be defined by or within one or more spaces or rooms of a building and the clients may be located in, around or adjacent to the one or more spaces or rooms.

The local area may be defined by or within a vehicle and the clients may be located in or on the vehicle. The users may be passengers located in or on the vehicle.

The local area may be defined by or within an aircraft and the clients may be located in or on the aircraft. The users may be passengers located in or on the aircraft.

The portable system may be readily installed in the local area by simply carrying the portable servers into the local area, arranging the portable servers around the local area such that each portable server is located within communication range of at least one of the other portable servers, and powering-up the portable servers. As such, the system may be used to establish a portable or "walk-on" wireless network in the local area. For example, the system may be installed in a vehicle to establish a portable or "walk-on" wireless network in the vehicle and the system may be operated to provide walk-on wireless in-vehicle entertainment, services and/or information. In particular, the system may be installed in an aircraft to establish a portable or "walk-on" wireless network in the aircraft and the system may be operated to provide walk-on wireless in-flight entertainment, services and/or information.

Any one portable server may communicate wirelessly with the at least one other portable server for the wireless distribution or dissemination of information or data such as content between the portable server and the at least one other portable server. Any one portable server may establish communications with the at least one other portable server when the portable server is first powered up and is within communication range of the at least one other portable server. Any one portable server and the at least one other portable server may form a mesh network for the wireless distribution or dissemination of information or data such as content. This may serve to simplify, or improve the efficiency of, the distribution or dissemination of new or updated information or data such as new or updated content between the portable servers when the new or updated information or data is downloaded to one of the portable servers. Such a system may simplify, or improve the efficiency of, the distribution or dissemination of new or updated software between the portable servers when the new or updated software is downloaded onto one of the portable servers.

According to an aspect or an embodiment of the present invention there is provided a system for wirelessly distributing content to a plurality of clients in a local area, the system comprising a plurality of portable servers, wherein each portable server is configured for storing content, each portable server is configured for wireless communication with one or more corresponding clients for wireless distribution of at least some of the stored content to the one or more corresponding clients, and each portable server is configured for wireless communication with at least one of the other portable servers.

According to an aspect or an embodiment of the present invention there is provided a system for the wireless distribution of content in a local area, the system comprising:
a plurality of portable servers; and
a plurality of clients,
wherein each portable server is configured for storing content, each portable server is configured for wireless communication with one or more corresponding clients for wireless distribution of at least some of the stored content to the one or more corresponding clients, and each portable server is configured for wireless communication with at least one of the other portable servers.

The content may comprise visual content such as video content and/or web content. The content may comprise audio content. The content may comprise entertainment content. The content may include Movie and TV video, music, audiobooks, eMagazines and newspapers, and games such as HTML5 games. The content may comprise information relating to at least one of shopping services, maps such as moving maps, flights, destination information, airport information, and food and drinks orders. The content may comprise advertising content.

In a further aspect, which may be provided independently, a portable server is provided for use in a system for wirelessly distributing content to a plurality of clients in a local area, wherein the portable server is configured for storing content, the portable server is configured for wireless communication with one or more of the clients for wireless distribution of at least some of the stored content to one or more of the clients, and the portable server is configured to remember recent content that one or more users of the one or more of the clients have viewed and, on subsequent login, to present the same content to the one or more users for continued viewing.

For example, one or more of the portable servers may be configured to remember recent items that a user has viewed and, on subsequent user login, to present the same items to the user for continued viewing. In the case of video content, this may include resuming playback at the last point viewed by the user. This function may be provided inside a web browser such as Chrome, Safari, Firefox or the like without the need for a native app on iOS or Android.

Each portable server may comprise a wireless transceiver such as a Wi-Fi access point. The Wi-Fi access point may be operated so as to provide a Wi-Fi cell for wireless communication with the one or more corresponding clients in the Wi-Fi cell. The system may establish a Wi-Fi network in the local area, allowing users to connect their own mobile devices or laptops to the Wi-Fi network in the local area. Once connected to the Wi-Fi network, a user can use their browser, or an app to browse content stored on the system through a menu interface.

Each portable server may be configured to provide content wirelessly to the one or more corresponding clients in response to a request from the one or more corresponding clients.

Each portable server may comprise a power supply such as a rechargeable battery. The power supply may be removable. This may permit the power supply to be replaced periodically, for example at a time which is convenient to an operator of the system.

When the system is installed in a vehicle, this may permit the power supply to be replaced when the vehicle is stationary, for example because the vehicle is parked or docked at a depot, station or port. For example, when the system is installed in an aircraft, this may permit the power supply to be replaced when the aircraft is stationary at an airport.

Airline regulations prohibit the charging of batteries onboard or during flight. To comply with such aircraft regulations, each portable server may be configured to operate with no battery inserted using a direct 12V power supply from the aircraft.

Each portable server may have a 12V power port which can be used as a power source as an alternative to battery power.

Each portable server may be configured so that 12V power can be used to power the portable server directly when there is no battery present.

Each portable server may be configured so that if a battery is present, the 12V power will charge the battery. The installation of such a system does not require any modification to the local area. This may be particularly advantageous when the local area is defined by or within an aircraft because installation of the system does not require a Supplemental Type Certificate (STC).

The system may be configured to operate independently of any existing systems or infrastructure in the local area in which the system is installed. The system may, therefore, be compatible with any existing systems or infrastructure in the local area in which the system is installed. This may be particularly advantageous when the local area is defined by or within an aircraft because the system may be compatible with different aircraft and/or different cabin management systems.

The system may be incapable of interfering with any existing systems or infrastructure in the local area in which the system is installed. The system may be incapable of requesting information from, transmitting or writing information to, or sending commands to, a system of the local area or vehicle in which the system is installed. Thus, the system may not be able to influence or control any of the existing systems or functions of the local area or vehicle in which the system is installed. This may be advantageous for safety or security reasons. This may be advantageous when demonstrating compliance with regulations. This may be particularly advantageous when the local area is defined by or within an aircraft because the system may not be able to influence or control any systems of the aircraft in any way and because this may avoid any requirement for a Supplemental Type Certificate (STC) to allow use of the system on the aircraft.

Each portable server may be configured for location or storage within a vehicle. For example, each server may have a size, shape and/or weight to permit location or storage within a vehicle. Each portable server may be configured to be located or stored within an aircraft. For example, each portable server may be configured to be located or stored within a bin or locker of an aircraft such as an overhead bin or locker of an aircraft.

Each portable server may store the same content.

Each portable server may store encrypted content.

Each portable server may be configured to authenticate each of the one or more corresponding clients using an appropriate mechanism in order to control access to the encrypted content stored in the portable server.

The portable servers may include one or more portable content servers and one or more portable DRM licence servers. For example, the portable servers may include a plurality of portable content servers and one or more portable DRM licence servers. As will be described in more detail below, the one or more content servers and the one or more DRM licence servers may have different functionality. The one or more content servers and the one or more DRM licence servers may comprise different software. The one or more content servers and the one or more DRM license servers may comprise or use different processors. The DRM licence software of a DRM licence server may not be compatible with the processor of a content server. Each content server may comprise or use an ARM processor. ARM processors have a lower power requirement which may help to preserve or prolong battery life. Each DRM licence server may comprise or use an Intel processor. An Intel processor may support the DRM license software. The content servers and the one or more DRM licence servers may define or form a mesh network for the exchange of licenses.

A content server may receive a request for a content item from a client. In response to receipt of the request for the content item, the content server may request a licence from a DRM licence server. In response to receipt of the licence request, the DRM licence server may provide an encryption key to the content server. The DRM licence server may be configured to authenticate the client device using an appropriate mechanism in order to control access to encrypted content stored in the content server. The content server may provide the encryption key to the client which requested the content item together with the encrypted content. The client may be configured to decrypt the encrypted content using the encryption key. For example, the client may comprise a bespoke app, plugin or content decryption software which uses the encryption key to decrypt the encrypted content to permit the user of the client to view and/or listen to the content for a time-limited period. The encrypted content may be streamed to the client and decrypted at the client in real-time or substantially in real time. Alternatively, the encrypted content may be downloaded to the client and decrypted at the client before the user views and/or listens to the content.

For encrypted content such as DRM encrypted content, the client may require an app or EME (Encrypted Media Extensions) and a CDM (Content Decryption Module) compatible browser to playback the DRM content. For Android and iOS devices an app which includes a CDM or equivalent software is required to playback DRM protected content. The app may be available from the Apple App Store and/or the Google Play Store and can be presented as a standalone app or an app which incorporates a DRM player such as an app for the operator of the local area such as an operator of the vehicle or the aircraft in which the system is installed. In each case, the app includes a robust implementation of approved DRM components required to request licenses and decode encrypted data for playback.

The content servers may be arranged around the local area such that each client is located within communication range of at least one of the content servers. Each client may download content from the closest content server. This may avoid unnecessary load on the network.

The system may be divided into two or more Virtual Local Area Networks (VLANs). Specifically, each content server may communicate with one or more corresponding clients over a corresponding public VLAN (VLAN 1). Each content server may communicate with a DRM licence server over a private mesh VLAN 2. Communications that must cross the private mesh VLAN 2 are managed by a forward proxy on the servers. The proxy receives requests, and based on defined traffic rules, will forward where appropriate to other servers on the private mesh VLAN 2. In this way, a client may request encryption (DRM) license keys from a DRM licence server, via a content server. The content server forwards the request to the DRM licence server, the DRM licence server responds with the license key, and the content server forwards the response back to the client. This use of segregated network segments avoids the need for active load balancing to route requests to the closest content server. For one or more of the portable servers, messages from a client device received at the portable server may be actioned or otherwise processed at the portable server or may be forwarded or otherwise transmitted to one or more of the other portable servers depending on the type of the message.

Each portable server may comprise a processor. Each portable server may comprise an operating system which is executable on the processor. The operating system may be encrypted. The operating system may be encrypted using LUKS (Linux Unified Key Setup). This is a full disk encryption mechanism that ensures that the system software cannot be read directly from the disk to another device. The operating system may be encrypted using LUKS Cipher: aes-xts with 256 bit key.

Each portable server may comprise a single board computer server which includes the processor. The single board computer server may comprise an operating system drive or disk. The operating system drive or disk may be encrypted. The operating system drive or disk may be encrypted using LUKS (Linux Unified Key Setup). The operating system drive or disk may be encrypted using LUKS Cipher: aes-xts with 256 bit key. The single board computer server may implement the functionality of a content server. The single board computer server may implement the functionality of a DRM licence server. The single board computer server may comprise a system clock.

The functionality of a portable content server and a portable DRM licence server may be combined in a portable combined content and DRM licence server which may be a single physical unit. Such a portable combined content and DRM licence server may comprise a processor such as an Intel processor for implementing or controlling the functionality of a content server and the functionality of a DRM licence server.

The portable servers may include one or more portable content servers and one or more portable combined content and DRM licence servers.

The one or more portable content servers and the one or more portable combined content and DRM licence servers may be arranged around the local area such that each client is located within communication range of at least one of the servers. Each client may download content from the closest server. This may avoid unnecessary load on the network. The system may be configured to receive or download the content for distribution to the plurality of clients.

The content received by, or downloaded to, the system may comprise one or more content updates.

The system may be configured to receive content updates periodically e.g. the system may operate as a "sometimes-connected" system. The system may be configured to receive content updates at convenient but infrequent times, for example when a vehicle in which the system is installed is stationary at a depot, station or port. In particular, the system may be configured to receive content updates at convenient but infrequent times, for example when an aircraft in which the system is installed is stationary at an airport during a turnaround period between flights.

Each portable server may select and download a different portion of the content to be loaded. Each portable server may then share the downloaded portion of the content with each of the other portable servers. In this way, the different portions of the content to be loaded do not need to be individually downloaded by every portable server thereby reducing the time for download of the content to the system. This may be particularly advantageous when the system is installed in a vehicle such as an aircraft and where the content must be updated in a limited time period when the vehicle is stationary e.g. when the aircraft is stationary at an airport or on the ground between flights.

The system may maintain a large library of content items for users to consume. The library may be updated from time to time, with some items being added, and some removed.

For efficient updating of the content library, the system may accept content updates that consist of only the changed parts of the content library. That is, an update will consist of a list of items to be deleted or changed, along with any new resources, media files or metadata to be added to the content library.

To ensure that file corruption does not affect the content downloaded to the system, a file hash (SHA1) may be used to verify bit-for-bit integrity between a content file prior to download and a copy of the content file after download to one or more of the portable servers. A hash of each content file may be calculated during preparation of the content file for download. The system may download a manifest comprising the calculated hashes when downloading the content files. For example, one or more of the portable servers may download the manifest of file hashes during downloading of the content files to the one or more portable servers. After each content file is downloaded, a hash of the downloaded content file may be calculated and verified against the manifest to ensure validity. Where there is a hash fail indicating an invalid content file, the system may verify the location of the corruption in the content file and request that only the affected portion of the content file is downloaded again. The system may detect the location of the corrupted portion using a sequence of block hashes. For example, the system may calculate the hashes of a sequence of blocks of the source file, each block being of a fixed size, smaller than the original file, e.g. 1 Megabyte. Where the system detects a hash fail of the overall hash, the system may examine the hash sequence to detect which block or blocks are valid, and which are corrupt. The system may then re-request any corrupt blocks. This removes the need to re-download valid portions of the file which were previously downloaded.

Content may be downloaded to the system in a variety of different ways. For example, one or more of the portable servers may be configured to receive content from one or more portable storage devices. One or more of the portable servers may comprise one or more receptacles for one or more portable storage devices. The content may be downloaded to one or more of the portable servers by physically inserting each of the one or more portable storage devices into a corresponding receptacle, where the one or more portable storage devices remain for the duration of a content cycle. At the end of the content cycle the one or more portable storage devices are removed and replaced with an updated portable storage device. Each of the one or more portable storage devices may comprise non-volatile memory. Each of the one or more portable storage devices may comprise a flash memory, an SD card or a Micro SD card or the like. Each of the one or more portable storage devices may be encrypted e.g. with LUKS using the aes-xts with a 256-bit key or any other suitable encryption algorithm. This protects the content during transport and in case of removal of the one or more portable storage devices from the one or more receptacles. Each receptacle may comprise a USB interface and/or a USB port for connecting the one or more portable storage devices to the processor of the server concerned. Each USB port may be protected from casual access behind a panel secured by security screws such as torx security screws which require special tools to remove.

A content loader device may be provided to an operator of the system (e.g. an airline), which content loader device acts as a local distribution server node for distributing content files or packages to the system. The content loader device may be located outside of the local area in which the system is installed. The content loader device may be installed or located adjacent or close to the local area. For example, the content loader device may be located outside of the vehicle (e.g. aircraft) in which the system is installed, for example at a depot, station, port or the like for the vehicle (e.g. airport). The content loader device may connect over the internet to one or more cloud content servers to retrieve content items and updates. The content loader device can authenticate to the cloud content server and securely retrieve content items from the cloud content server, for example using an SSL protected web protocol. The content loader device may be portable. This may permit the content loader device to be carried into the local area or to be installed or located adjacent or close to the local area.

One or more of the portable storage devices may be physically transported to the content loader device or vice versa to receive the content files or packages to be downloaded to the system.

The content loader device may be connectable or connected to a wired Ethernet network. One or more of the portable servers may be connectable or connected to the content loader device using a wired connection and powered on. One or more of the portable servers may connect automatically to the Ethernet network. One or more of the portable servers may have a USB Ethernet adaptor for this purpose. One or more of the portable servers may authenticate to the content loader device and may download the encrypted content files from the content loader device using an encrypted transport protocol. One or more of the portable servers may be transported to the content loader device or vice versa to permit a wired connection therebetween.

Alternatively, the content loader device may be connectable or connected to a secure content loading wireless network. The secure content loading wireless network may be protected by WPA2 security. The secure content loading wireless network may not broadcast an SSID. The system may be placed within range of the secure content loading network, and powered on. The system may connect automatically to the secure content loading network.

One or more of the portable servers may be connectable or connected to a secure content loading wireless Wi-Fi (IEEE 802.11) network for downloading content from the content loader device. For example, one or more of the portable servers may be configured for downloading content from the content loader device via the wireless transceiver e.g. via the Wi-Fi access point. One or more of the portable servers may authenticate to the content loader device and may download encrypted content files from the content loader device using an encrypted transport protocol.

One or more of the portable servers may comprise a cellular modem such as a USB cellular modem for downloading content over a cellular network. One or more of the portable servers may connect over the cellular network to cloud content servers to retrieve content items and/or updates. One or more of the portable servers may authenticate to the cloud content server. One or more of the portable servers may securely retrieve content items using a secure protocol.

When the system is to be installed on an aircraft, one or more of the portable servers may comprise one or more sensors for use in detecting when the aircraft is on the ground. It may be important to determine when the aircraft is on the ground because airline regulations in many locations worldwide require a cellular modem to be inactive (i.e. not transmitting) during flight.

One or more of the portable servers may comprise one or more sensors for use in detecting when the aircraft is below a certain altitude. For example, one or more of the portable servers may comprise a pressure sensor for sensing barometric pressure in the aircraft cabin which is known to be related to the aircraft's altitude. The processor may calculate vertical speed by converting a rate of change of pressure into a rate of change of altitude.

One or more of the portable servers may comprise one or more sensors for use in detecting when the aircraft is not moving. For example, one or more of the portable servers may comprise an accelerometer such as a 3-axis accelerometer. The accelerometer may measure instantaneous acceleration and the processor may calculate the difference from the current rolling average acceleration in each axis. If the difference in acceleration from the rolling average exceeds a threshold then the processor determines that the aircraft is moving.

These features may be particularly important so in a further aspect, which may be provided independently, there is provided a portable server for use in an aircraft comprising a sensor resource comprising at least one sensor, configured to detect when the aircraft is below a threshold altitude, and/or to determine when the aircraft is substantially stationary, and/or to determine when the aircraft is on the ground. The sensor resource may comprise a processing resource configured to perform the determining in dependence on sensor signals from the at least one sensor.

One or more of the portable servers may comprise an optical sensor or light sensor such as a light sensitive resistor, photocell, photodiode or the like for measuring light levels in the environment in which the portable server is located. The light sensor may be used to detect light when the portable server is located in an overhead luggage bin. In this case, the portable server must be correctly oriented in the luggage bin to detect light when the bin is open. The portable server may have a fascia which is printed with guidance on the correct orientation, for example "This side facing the cabin", "This way up" and/or the like.

One or more of the portable servers may comprise a three position switch to control the cellular modem. The switch positions may be ON, OFF, AUTO.

ON forces the modem to be powered.

OFF removes power from the modem.

AUTO allows the portable server to control the power to the modem. When in AUTO mode, the portable server may analyse data from at least one of the pressure sensor, the 3-axis accelerometer and the light sensor to determine whether the aircraft is on the ground so that the cellular modem may be enabled.

The portable server may apply logic to the inputs from the sensors to implement a policy for activation of the modem. The policy may differ between regulatory regions hence a variable behaviour may be implemented in software to observe/disregard some sensor inputs, and to vary the quantitative threshold values in use. Example policies may be:

Policy A

IF—the altitude is below a first height threshold (e.g. 1500 feet),
    AND—no motion is detected for a first time period (e.g. 120 seconds),
    AND—vertical speed is less than a first vertical speed (e.g. 50 feet per minute),
    ENABLE the modem.
IF motion is detected for a second time period (e.g. 20 seconds or longer),
    DISABLE the modem.
IF the altitude is greater than a second height threshold (e.g. 1600 feet),
    DISABLE the modem.
If vertical speed is greater than a second vertical speed (e.g. 60 feet per minute),
    DISABLE the modem.

Policy B

IF—the altitude is below a first height threshold (e.g. 1000 feet),
    AND—no motion is detected for a first time period (e.g. 300 seconds),
    AND—light is detected,
    ENABLE the modem.
IF motion is detected for a second time period (e.g. 20 seconds or longer),
    DISABLE the modem.
IF the altitude is greater than a second height threshold (e.g. 1100 feet),
    DISABLE the modem.
If no light is detected,
    DISABLE the modem.

The use of asymmetric threshold values builds hysteresis into the activation of the modem to prevent rapid oscillation between the on and off states.

In most aircraft deployment scenarios there will be several portable servers in the cabin. The portable servers may form a cluster to collectively download the content. Each portable server may download the next content file in a queue of content files until all content files are downloaded to the cluster. The content files are then shared between the portable servers in the cabin until all the portable servers have received the downloaded content files. This allows for faster downloads as it avoids any requirement to download the same content files to all the portable servers in the same aircraft.

One or more portable servers can receive content updates by insertion of physical media or over a network connection. The network connection may be achieved using wired, Ethernet, Wi-Fi (802.11), and/or by 3G/4G cellular modem connection. These connections have varying speeds and associated transport costs. 3G/4G cellular traffic typically has a cost per megabyte, whereas a broadband Ethernet or Wi-Fi connection is a fixed cost. This creates a problem in that there may be content items that are to be sent to one or more of the servers in the field, but will incur a large cost if sent by cellular modem. To resolve this, the system implements a routing policy whereby content items (files, data, images etc) or classes of content or data (e.g. movies, TV, magazines, newspapers) can have a policy applied which determines the permissible transport routes for that item or class of item. For instance, a movie item is a large file that changes infrequently and is reserved for physical transport distribution. A weekly news show is a large file that changes weekly, and is permitted for wireless update to one or more of the servers. A daily newspaper is a smaller file that changes daily, and is permitted for cellular update to one or more of the servers.

One or more of the portable servers may comprise a 5V USB power connection between the processor and the modem. The 5V USB power connection may comprise a +5V line and a ground line.

The ground line may have an inline switch such as an inline MOSFET transistor. The inline switch may control current flow on the ground line.

The processor may use a GPIO pin output to control the power to the modem. The GPIO may provide a voltage to a control terminal of the inline switch (e.g. a positive voltage on a gate pin of the MOSFET). This may allow current to flow through the inline switch (e.g. from source to drain of the MOSFET) to enable the modem.

An equivalent arrangement may be used on the +5V line. The use of two such arrangements may provide redundancy to ensure that in certain failure conditions the modem will not activate while uncommanded, e.g. where there is a short-circuit that enables an alternative circuit or ground, bypassing the ground line MOSFET inline switch.

When the modem is active, one or more of the portable servers can determine Local Area Code and Cell ID of the local cell tower. The processor of the portable server may use this information to lookup geolocation information for the portable server to give an approximate location, without GPS.

Where large content files are downloaded over a slow communication link, the transfer time may exceed the length of time for which the communication link is available. For example, this may occur when the system is in range of a wireless connection only while an aircraft on which the system is installed is located at a gate during a turnaround period between flights. In such a case, the system may pause the transfer when the communication link is lost, and then resume the transfer from that point, when the communication link is re-established.

The system may be capable of receiving information or data which is transmitted or broadcast from the aircraft, for example from one or more of the aircraft systems.

One or more of the portable servers may provide "moving map" information. This may allow a user to view a map showing the current position of the vehicle (e.g. aircraft) in which the system is installed and other journey information (e.g. flight information such as altitude, ETA etc.).

One or more of the portable servers may comprise a radio receiver, for example a UHF radio receiver, which may be used to monitor for position broadcasts sent by the aircraft for example for air traffic control purposes. These are known as ADS-B-out (Automatic Dependent Surveillance—Broadcast out) transmissions. The messages may contain position, ICAO callsign (hex), altitude, flight number, and/or other data. The processor of a portable server may parse the received position broadcasts to determine current flight information for display on a moving map at the one or more clients.

In a further aspect, which may be provided independently, there is provided a portable server for use in an aircraft, comprising a radio receiver configured to monitor a position broadcast sent by a radio transmitter of the aircraft. A processing resource of the portable server may be configured to process the position broadcast, or data represented by the position broadcast, and to generate flight information data for display on a moving map at the one or more clients.

Monitoring position broadcasts sent by the aircraft may avoid any requirement to modify the aircraft systems. In addition, monitoring position broadcasts sent by the aircraft in this way does not require any of the portable servers to be compatible with any particular type of aircraft system. Monitoring position broadcasts sent by the aircraft in this way does not require any of the servers to transmit, write or send commands to an aircraft system. Consequently, the portable servers are not capable of transmitting, writing or sending commands to the aircraft system and are not, therefore, capable of controlling an aircraft system. Also, monitoring position broadcasts sent by the aircraft in this way may avoid any requirement to use a GPS receiver located inside one or more of the portable servers. This may be advantageous because a GPS receiver located inside a portable server may not receive sufficient signal to establish a fix.

The ADS-B is a broadcast signal and messages may be received from other aircraft in the vicinity of the system. Thus, one or more of the portable servers may apply logic to the received data in order to determine if it is from the aircraft on which the server is installed.

The antenna gain of the UHF radio receiver may be reduced to the lowest level at which signals can be reliably received from the installed aircraft. This is to reduce chatter from nearby aircraft. One or more of the portable servers may store a callsign whitelist which contains the ICAO callsigns of each aircraft on which it may be installed. One or more of the portable servers may use the whitelist to filter received data and discard any position info from aircraft not on the whitelist.

Where there is a conflict, i.e. data is received from two or more aircraft on the whitelist at the same time, one or more of the portable servers may analyse the number of messages received from each aircraft, and select the aircraft which has sent the most messages as the installed aircraft. Where there is not a clear preference from the count, the system will not display information that may be incorrect, e.g. where there are two possible flight numbers.

One or more of the portable servers may comprise a GPS receiver for location. The GPS receiver does not receive a signal in the cabin during flight, but may be used on the ground for tracking, so that the system can report its location the next time it has a network connection.

The system may be capable of transmitting information from the aircraft system to one or more of the clients. The system may be capable of broadcasting information to the plurality of clients. For example, one or more of the portable servers may be configured to receive an audio signal input from the aircraft. The audio signal input is connected to the cabin intercom system headphone or line-out audio jack. One or more of the portable servers may be configured to monitor the audio signal level and determine when an announcement is in progress during a flight. The audio signal level may be smoothed to provide a reliable audio signal measurement. An audio signal level threshold may be used to determine when an announcement is in progress. When the announcement is in progress, each portable server may send a command to the one or more corresponding clients on the network to pause playback of content and to request that the user pays attention to the cabin announcement. When the announcement ends, the audio signal drops below the threshold level and this is detected. Each portable server may then send a command to the clients in the cabin to resume playback of content.

One or more of the portable servers may have a physical control or button on the exterior to provide a manual signal that an announcement is in progress. In response to a button press on any one of the portable servers, the portable server concerned transmits a signal over the mesh network to all the other portable servers, playback is interrupted at all the clients on the network and each user is informed that an announcement is in progress by way of a visual and/or audio message via the corresponding client.

One or more of the portable servers may have a network interface and an API command to allow a crew device and/or a crew app to provide the manual signal that an announcement is in progress.

One or more of the portable servers may provide an API so that a crew device such as a mobile or tablet can communicate with the one or more portable servers to provide administrator control and information. The API may use the mesh network between the portable servers to support usage across the cabin.

One or more of the portable servers may be configured to allow any of the clients to communicate with the crew device so that the crew device may receive a notification when a passenger makes a request. The request may include an order for one or more food items, drink items and/or duty free items. The request may include an order for one or more content items such as one or more movies, games or the like. The request may include a list of items and the cost. The crew device may be a $3^{rd}$ party Point of Sale device. In this case the system API can automate the message delivery to the PoS device with the transaction details and costs. The API may allow the PoS device to take the payment and then provide an authorisation code back to the system to confirm or reject the payment. One or more of the portable servers may have an onboard payment processing system. This may allow passengers to pay for requested items.

One or more of the portable servers may have PCI-DSS software such as a PCI-DSS compliant software component provided by a third party for capturing and storing payment data. One or more of the portable servers may store transaction data for later offload when connectivity is available, typically using the cellular modem. The automatic enable system of the modem may provide for timely upload of transaction data. The timely upload may provide an improvement in transaction approval rates because rejection rates typically increase as the delay between the transaction and presentation for payment increases.

One or more of the portable servers may provide a messaging feature to connected client devices. This may be used for crew announcements, and also for passenger chatroom or seat-to-seat messaging. The messaging feature may use the mesh network to route messages between the portable servers so that e.g. passengers at the front of the aircraft who are connected to one portable server can communicate with passengers at the rear of the aircraft who are connected to a different portable server.

One or more of the portable servers may have a shell design whereby a top outer shell and a bottom outer shell have the same physical design. This may allow the two halves to be made from the same mould and to slot together.

One or more of the portable servers may contain internal separate moulding parts to allow for different internal hardware configurations. This may allow the internal layout to be changed without changing the moulds for the main outer components. This may allow 3D printed prototypes for the internal mountings and layout during the design stage.

One or more of the portable servers may comprise a temperature sensor which controls a main power line from the power supply to the single board computer and/or the processor. If the temperature exceeds a threshold, then the power supply is disconnected from the single board computer and/or the processor.

The power supply may provide both a 5V and a 12V power output. This may support different power requirements for the internal components. One or more of the portable servers may have one or more air vents to allow air circulation without the need for a fan.

One or more of the portable servers may be constructed from a fire retardant material to comply with air safety regulations.

One or more of the portable servers may incorporate removable side and end panels as separate components. This may allow the panels to be manufactured in airline colours, without remanufacturing the main body components.

One or more of the portable servers may have feet on the bottom and/or the top. The feet may provide friction and prevent sliding when the portable server is installed in the aircraft. The feet may be on the bottom and the top of the portable server so that it can be orientated in either direction.

One or more of the portable servers may be assembled using torx security screws. This may prevent casual access to the components of the portable server.

In a further aspect, which may be provided independently, a portable server is provided for use in a system for wirelessly distributing content including advertising content to a plurality of clients in a local area, wherein the portable server is configured for storing content including advertising content, the portable server is configured for wireless communication with one or more of the clients for wireless distribution of at least some of the stored advertising content to one or more of the clients, and the portable server is configured to function as an advertising server when the portable server is not connected to the internet.

The portable server may define a portable system for wirelessly distributing advertising content to the plurality of clients in the local area.

The portable server and at least one other portable server may together define a portable system for wirelessly distributing advertising content to the plurality of clients in the local area. Each portable server may be configured for wireless communication with one or more corresponding clients so that the portable system may distribute advertising content to the plurality of clients in the local area.

The portable system may be configured for occasional connection to the internet.

The portable system may be configured to deliver advertising content to the plurality of clients when the portable system has no connection, or no access, to the internet. The portable system may be configured to allow the advertising content to be updated and/or changed when the portable system has a connection, or access, to the internet.

In a further aspect, which may be provided independently, there is provided a system for wirelessly distributing content including advertising content to a plurality of clients in a local area, the system comprising a plurality of portable servers, wherein each portable server is configured for storing content including advertising content, each portable server is configured for wireless communication with one or more corresponding clients for wireless distribution of at least some of the stored advertising content to the one or more corresponding clients, and each portable server is configured to function as an advertising server when the portable server is not connected to the internet.

In a further aspect, which may be provided independently, there is provided a system for the wireless distribution of content including advertising content in a local area, the system comprising:

a plurality of portable servers; and
a plurality of clients, wherein each portable server is configured for storing content including advertising content, each portable server is configured for wireless communication with one or more corresponding clients for wireless distribution of at least some of the stored advertising content to the one or more corresponding clients, and each portable server is configured to function as an advertising server when the portable server is not connected to the internet.

For example, one or more of the portable servers may function as an advertising server. One or more of the portable servers may function as an advertising server when the portable server is not connected to the internet, for example, when inflight. One or more of the portable servers may comprise software for this purpose. Such advertising server functionality may be compliant with current web advertising standards, but will function in a distributed and offline model, where one or more of the portable servers act as nodes which communicate with one or more clients offline, but where one or more of the portable servers send data back to a master server when one or more of the portable servers get online. The master server may collate the data received from one or more of the portable servers to present a unified view of the received data to mirror behaviour of an online system. The master server may be provided with the cloud content server.

One or more of the portable servers may be configured for occasional communication with an advertising admin portal. The advertising admin portal may be provided with the content loader device and/or the cloud content server. The advertising admin portal may be a hosted service.

One or more of the portable servers may be configured for communication with the advertising admin portal when a connection is available, for example via a portable storage device, via a wired connection such as a wired Ethernet connection, and/or via a wireless connection such as a Wi-Fi (802.11) or a 3G/4G cellular modem connection.

One or more of the portable servers may be configured for communication with the advertising admin portal to receive updates, advertising creatives, images, video, HTML and other advertising content, campaign details and/or dates etc.

One or more of the portable servers may be configured for communication with one or more of the clients to provide advertising content to one or more of the clients. For example, one or more of the portable servers may be configured for communication with one or more of the clients so that one or more of the clients display one or more banner advertising images or banner adverts. One or more of the clients may be configured to display a web page when a corresponding user clicks on a banner advert.

One or more of the portable servers may be configured to communicate video adverts to one or more of the clients for display to the one or more corresponding users before, during and/or after each user views an item of video content e.g. a movie or a TV show.

One or more of the portable servers may be configured to collect user data from the clients.

One or more of the portable servers may be configured to collect from the clients the number of users that have seen an advert such as a banner advert or a video advert and the number of user "click-throughs".

One or more of the portable servers may be configured to collect user names, user contact details such as user email addresses and the like.

One or more of the portable servers may be configured to connect to the advertising admin portal when a connection is available to upload user data such as user view and click-through data and any other user data collected during the period when the portable server was not connected to the advertising admin portal. This way, the system may allow online configuration of advertising campaigns, and the portable servers will sync with the advertising admin portal whenever the portable servers are online, but will cache the campaign data when they are offline to enable the system to function when no connection is available e.g. when inflight.

The advertising admin portal may collect data from all the portable servers when they connect to the advertising admin portal. The advertising admin portal may then collate the collected data to allow campaign information and statistics to be made available to the portal users e.g. the number of portable servers, aircraft, and flights on which an advert was displayed, the number of users that viewed the advert, the number of clicks on the advert, and the click-through percentage rate.

One or more of the portable servers may be compliant with the VAST (Video Ad Serving Template) specification provided by the Interactive Advertising Bureau (IAB). This enables one or more of the portable servers to consume and serve the same creative and participate in the same campaigns as standard web advertising e.g. Google ads. As such, the system can comply with these standards, which are designed for an online environment, even though the web advertising is deployed in an offline environment which is only sometimes connected to the internet.

In an aspect or embodiment of the present invention there is provided a method for wirelessly distributing content to a plurality of clients in a local area, the method comprising the steps of:

providing a plurality of portable servers, each portable server comprising stored content; and arranging the portable servers in a local area to allow each portable server to communicate wirelessly with one or more corresponding clients for wireless distribution of at least some of the stored content to the one or more corresponding clients, and to allow each portable server to communicate wirelessly with at least one of the other portable servers.

The steps of the method may be performed sequentially or may at least partially overlap. The steps of the method may be performed in any order.

Features of any one aspect may be applied as features of any other aspect in any appropriate combination. For example, any one of method, system, apparatus or server features may be applied as any other of method, system, apparatus or server features.

BRIEF DESCRIPTION OF THE DRAWINGS

The present invention will be described by way of non-limiting example only with reference to the following drawings of which.

DETAILED DESCRIPTION OF THE DRAWINGS

Figure 1:
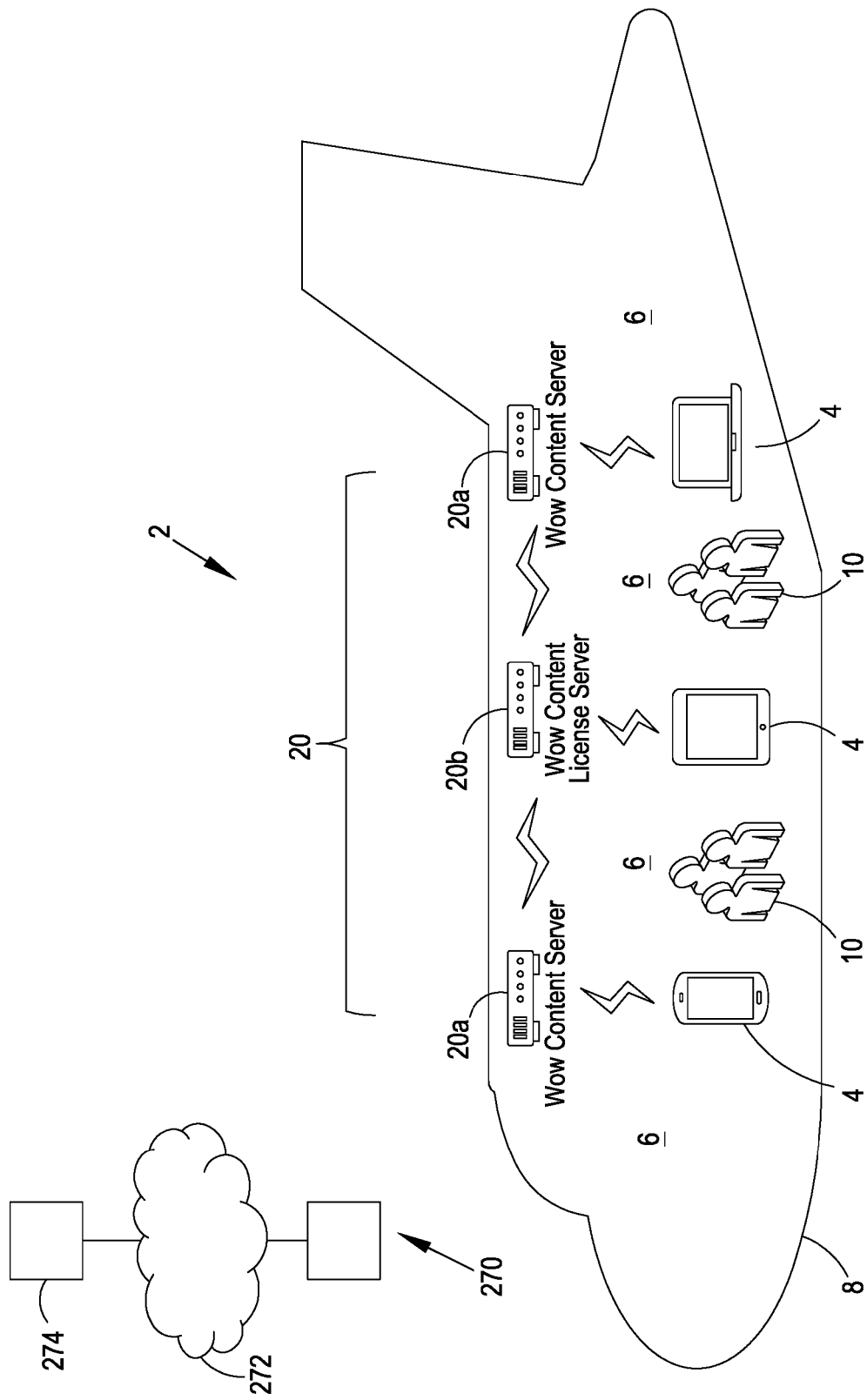
FIG. 1 is a schematic of a system for wirelessly distributing content to a plurality of clients in a cabin of an aircraft.

Referring initially to FIG. 1 there is shown a portable system generally designated 2 for wirelessly distributing content to a plurality of clients in the form of a plurality of mobile devices 4 in a local area in the form of a cabin 6 of an aircraft 8. Each mobile device 4 may be operated by a corresponding user 10. The portable system may be configured to deliver content to the mobile devices 4 without any requirement for the portable system 2 to be connected to, or to have access to, the internet.

The portable system 2 includes a plurality of portable servers 20 in the form of a plurality of portable content servers 20*a* and one or more portable content and Digital Rights Management (DRM) licence servers 20*b*. Each portable server 20 is arranged around the cabin 6 for wireless communication with one or more corresponding mobile devices 4. Each portable server 20 is also arranged around the cabin 6 so as to permit wireless communication with at least one of the other portable servers 20 so that, on power up of the portable servers 20, the portable servers 20 together form a wireless mesh network within the cabin 6.

Each mobile device 4 may a portable computing device which includes software such as a compatible browser or an app to permit the user 10 to communicate with, and select content stored on, any one of the portable servers 20 to permit the user 10 to view and/or listen to the content via the mobile device 4. For example, each mobile device 4 may be a smart phone, a tablet or a laptop. Each mobile device 4 may comprise an Apple iOS device, an Android device, an Apple MacBook and/or a laptop running Windows or Linux, and/or a device with an HTML5 compliant browser. The software may be installed on the corresponding mobile device 4 in advance of boarding the aircraft 8.

Each mobile device 4 may be carried onto the aircraft 8 by the corresponding user 10 before a flight and carried off the aircraft 8 by the corresponding user 10 after the flight. The portable system 2 does not require any dedicated or fixed client devices to be provided or to be permanently installed in the aircraft 8 for each user 10 to permit each user 10 to select, view and/or listen to content. The system 2 is designed for use in a Bring Your Own Device (BYOD) model. The BYOD model allows users 10 to use their own compatible mobile devices 4 to access the system 2: iOS, Android, PC or Mac.

Figure 2:
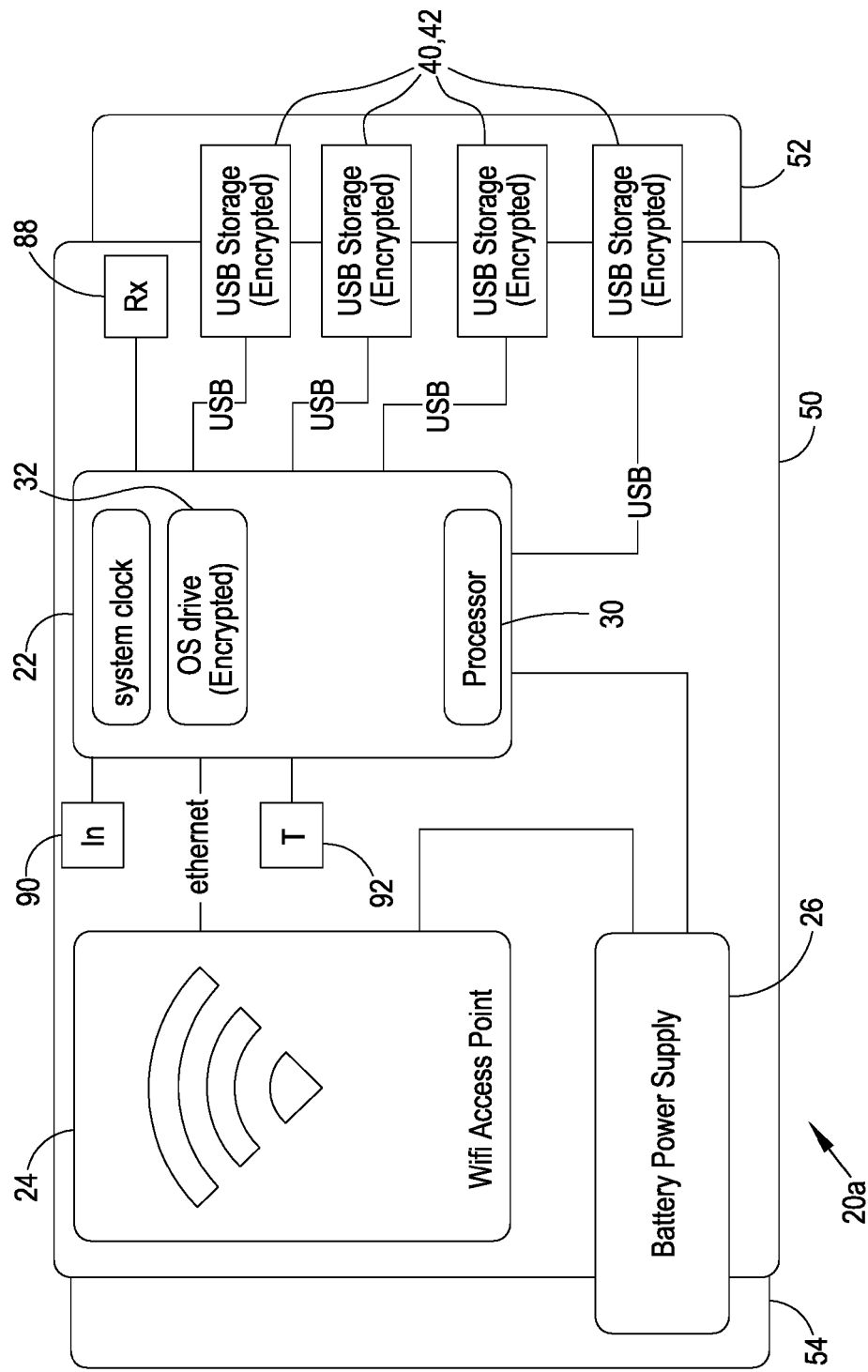
FIG. 2 is a functional block diagram of a portable content server of the system of FIG. 1.

As shown in FIG. 2, each portable content server 20*a* includes a single board computer 22, a wireless transceiver in the form of a Wi-Fi access point 24 and a battery 26 for supplying power to the single board computer 22 and the Wi-Fi access point 24. The single board computer 22 includes a processor 30 and an encrypted operating system drive 32 for storing operating system software. The processor 30 may have a relatively low power consumption for longer battery life. For example, the processor 30 may be an ARM processor. Each portable content server 20a further includes a plurality of USB ports 40, each USB port 40 being configured to receive a corresponding encrypted USB storage device 42 such as an SD card. Each of the USB storage devices 42 may be encrypted with LUKS using an aes-xts cipher with a 256-bit key.

Figure 3:
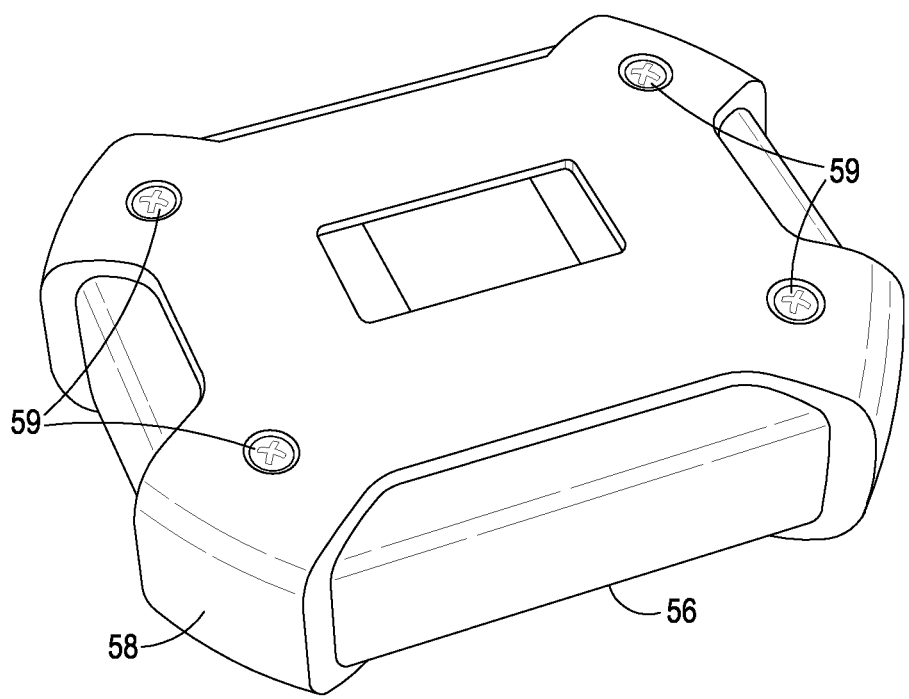
FIG. 3 shows an exterior view of a portable content server of the system of FIG. 1.

The portable content server 20a further includes a tamper proof case 50, a secure removable USB port access panel 52, and a removable battery access panel 54. The secure USB port access panel 52 is attached to the tamper proof case 50 by one or more security fasteners in the form of one or more torx security screws (not shown) which require special tools for removal of the secure USB port access panel 52 to provide access to the USB ports 40. As shown in more detail in FIG. 3, the tamperproof case 50 includes an inner shell 56 defined by a two inner shell parts (not shown explicitly) such as two moulded inner shell halves (not shown explicitly). Access to the inner shell 56 is controlled by an outer access arrangement 58 which is secured to the inner shell 56 by security fasteners such as torx security screws 59. One of ordinary skill in the art will understand that physical tamper-proofing of the case 50 can be circumvented by a determined attacker and, as such, the physical measures described above are not relied upon as a means of content protection.

Figure 4:
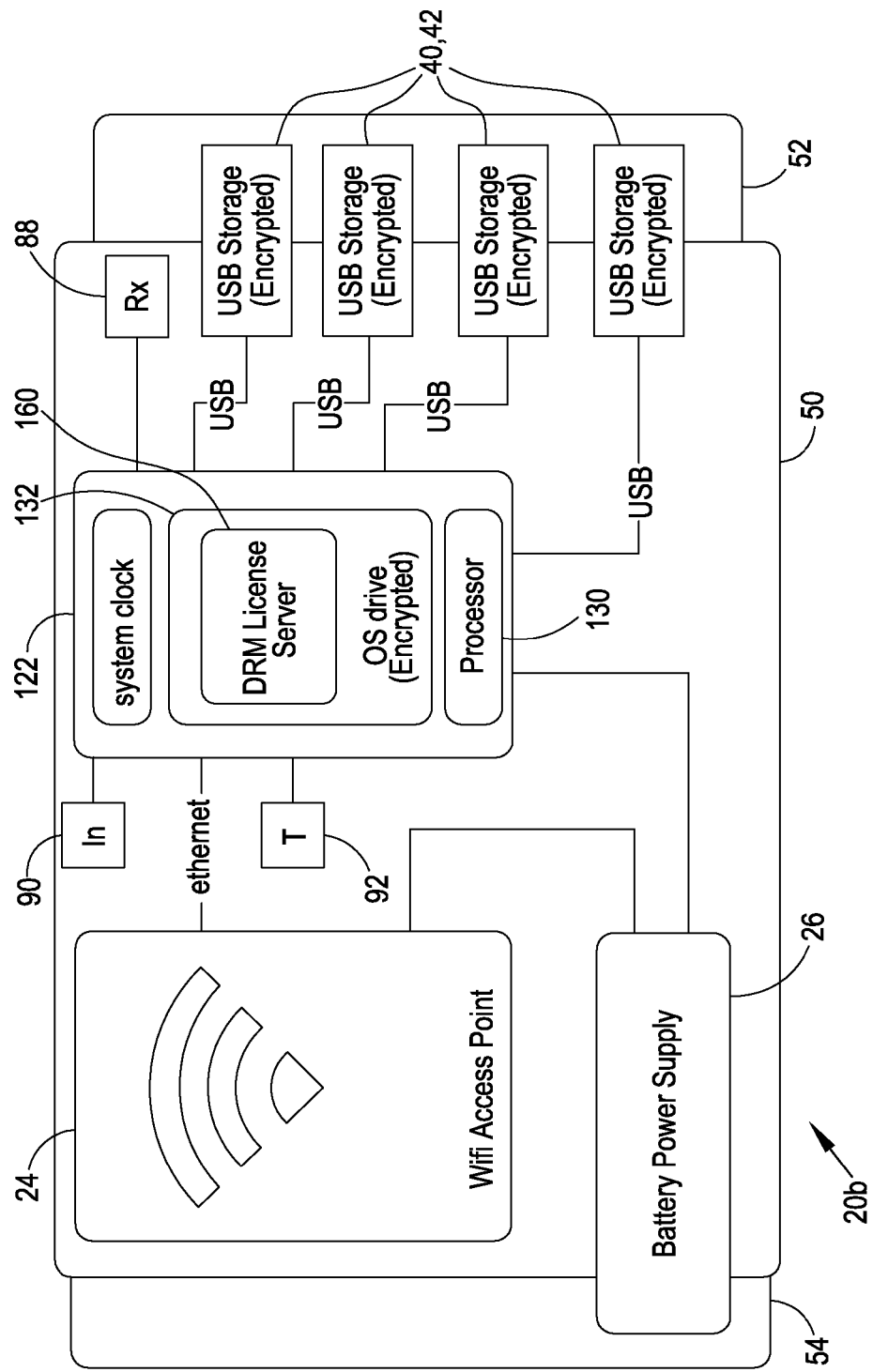
FIG. 4 is a functional block diagram of a portable DRM licence server of the system of FIG. 1.

As shown in FIG. 4, each portable content and DRM licence server 20b includes many of the same features as a content server 20a. Where differences exist between a feature of the portable content and DRM licence server 20b shown in FIG. 4 and a corresponding feature of the portable content server 20a shown in FIG. 2, the feature of the portable content and DRM licence server 20b is identified with the same reference numeral as the corresponding feature of the portable content server 20a of FIG. 2 incremented by "100". Specifically, as shown in FIG. 4, each portable content and DRM licence server 20b includes a single board computer 122, a Wi-Fi access point 24 and a battery 26 for supplying power to the single board computer 122 and the Wi-Fi access point 24. The single board computer 122 includes a processor 130, and an encrypted operating system drive 132 for storing DRM licence server software 160. The processor 130 may be selected according to its ability to support the DRM license server software 160. For example, the processor 130 may be an Intel processor.

Figure 5:
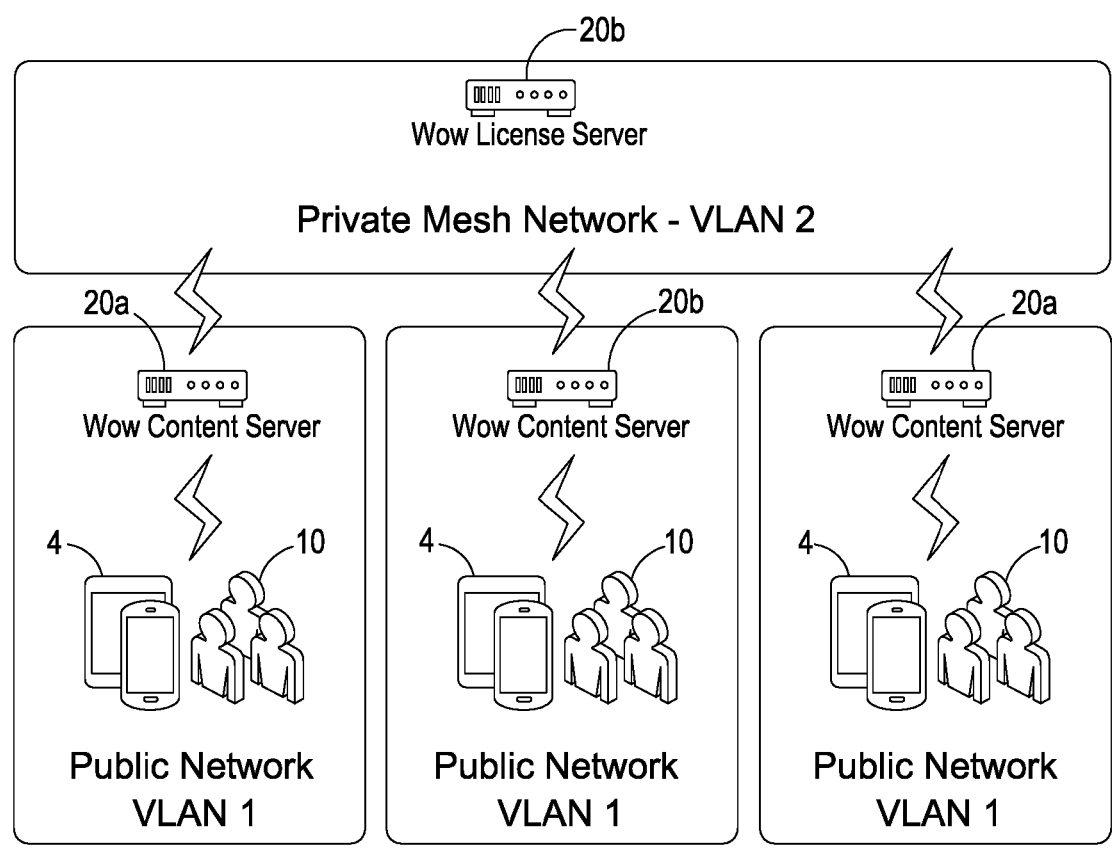
FIG. 5 is a schematic illustrating the operation of the system of FIG. 1.

As shown in FIG. 5, the system may be divided into two Virtual Local Area Networks (VLANs). Specifically, each content server 20a may communicate with one or more corresponding mobile devices 4 over a corresponding public VLAN (VLAN 1). The content and DRM licence server 20b may be considered to include content server component which defines or implements content server functionality and a DRM licence server component which defines or implements DRM licence server functionality. Each content server 20a may be considered to communicate with the DRM licence server component of the content and DRM licence server 20b over a private mesh VLAN 2. Communications that must cross the private mesh VLAN 2 are managed by a forward proxy on the content server 20a or the content and DRM licence server 20b. The proxy receives requests, and based on defined traffic rules, will forward where appropriate to other servers 20a, 20b on the private mesh VLAN 2. One of ordinary skill in the art will understand that FIG. 5 is an illustration of the virtual configuration of the public VLAN (VLAN 1) and the private mesh VLAN 2 and that, in reality, each of the content servers 20a and the content and DRM licence server 20b is actually configured to communicate with at least one of the other content servers 20a and the content and DRM licence server 20b as shown in FIG. 1.

In use, a user 10 who wishes to download a content item must first join the network by communicating wirelessly with one of the servers 20a, 20b via a user interface generated by the pre-installed software running on their own mobile device 4. The user 10 may be required to complete an authentication and/or registration process via the mobile device 4 before the user 10 may request a content item via the user interface. In response to the user request, the mobile device 4 requests an encryption (DRM) license key from the content and DRM licence server 20b either directly or indirectly via a content server 20a over the wireless mesh network. The content and DRM licence server 20b responds to the request by forwarding the license key to the mobile device 4 either directly or indirectly via a content server 20a over the wireless mesh network. The content and DRM licence server 20b or the content server 20a reads the encrypted content from one of the encrypted USB storage devices 42 connected to the content and DRM licence server 20b or the content server 20a and forwards the encrypted content together with the license key to the mobile device 4. The pre-installed software on the mobile device 4 uses the licence key to decrypt the encrypted content for playback to the user 10.

It should be understood that the servers 20a, 20b may store the same content. Content downloaded to one of the servers 20a, 20b may be distributed to the other servers via the wireless mesh network in order to synchronise the content across all of the servers 20a, 20b. This may be particularly advantageous when it is necessary to download or update the content in a short period of time, for example during a turnaround between flights. For example, to update the content stored on the servers 20a, 20b, one or more of the encrypted USB storage devices 42 may be simply disconnected from one of the servers 20a, 20b and replaced with one or more replacement encrypted USB storage devices 42, wherein the one or more replacement encrypted USB storage devices 42 together store the updated content. The updated content is subsequently distributed between all of the servers 20a, 20b over the wireless mesh network.

As shown in FIG. 1, the operator of the system 2 (e.g. the airline or the airport operator) may be provided with a content loader device 270 which may be portable or which may be located outside, for example remotely from, the local area 6 defined by the aircraft 8. The content loader device 270 may, for example, be located at or near a gate at an airport. The content loader device 270 may be connected via the Internet 272 to one or more cloud content servers 274. The content loader device 270 authenticates to the one or more cloud content servers 274 and securely retrieves encrypted content from the one or more cloud content servers 274 via the Internet 272, for example using an SSL protected web protocol.

One or more of the encrypted USB storage devices 42 may be physically transported to, and connected with, the content loader device 270 periodically to permit the updated content to be downloaded periodically from the content loader device 270 to one or more of the encrypted USB storage devices 42 over a wired connection. The encrypted USB storage devices 42 may subsequently be transported back onto the aircraft 8 and reconnected to one or more of the servers 20a, 20b. The content loader device 270 may be carried onto the plane if required for ease of connection with one or more of the encrypted USB storage devices 42.

Figure 6:
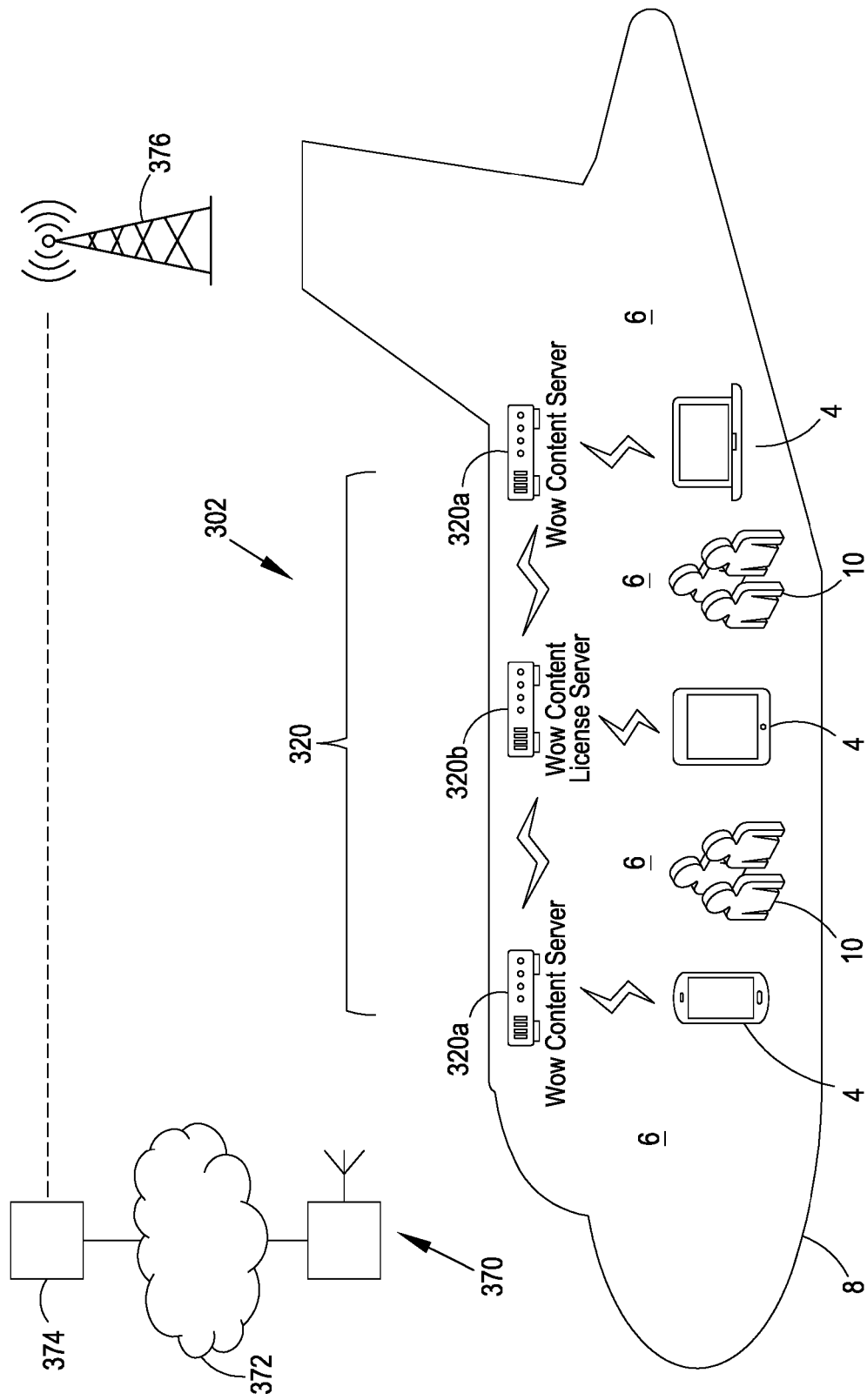
FIG. 6 is a schematic of an alternative system for wirelessly distributing content to a plurality of clients in a cabin of an aircraft.

FIG. 6 shows an alternative system 302 for wirelessly distributing content to a plurality of clients in the form of a plurality of mobile devices 4 in a local area in the form of a cabin 6 of an aircraft 8. Like the system 2 described with reference to FIGS. 1 to 5, the alternative system 302 includes a plurality of portable servers 320, in the form of a plurality of portable content servers 320a and one or more portable content and Digital Rights Management (DRM) licence servers 320b. Each portable server 320 is arranged around the cabin 6 of the aircraft 8 for wireless communication with one or more corresponding mobile devices 4. Each portable server 320 is also arranged around the cabin 6 so as to permit wireless communication with at least one of the other portable servers 320 so that, on power up of the portable servers 320, the portable servers 320 together form a wireless mesh network within the cabin 6.

Figure 7:
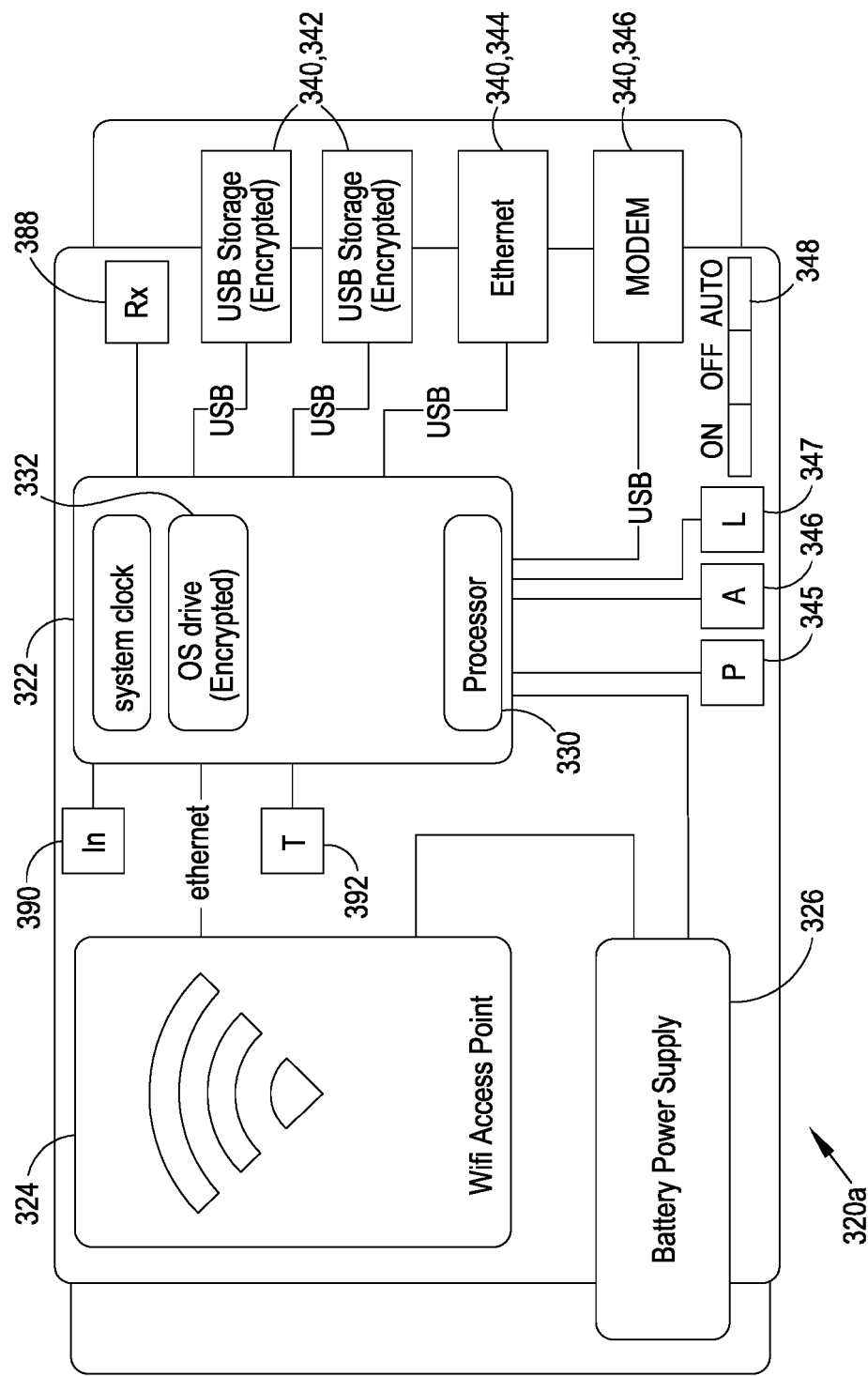
FIG. 7 is a functional block diagram of a portable content server of the alternative system of FIG. 6.

As shown in FIG. 7, each portable content server 320a includes a single board computer 322, a wireless transceiver in the form of a Wi-Fi access point 324 and a battery 326 for supplying power to the single board computer 322 and the Wi-Fi access point 324. The single board computer 322 includes a processor 330 and an encrypted operating system drive 332 for storing operating system software. The processor 330 may have a relatively low power consumption for longer battery life. For example, the processor 330 may be an ARM processor. Each portable content server 320a further includes a plurality of USB ports 340.

One of ordinary skill in the art will understand that the portable content and Digital Rights Management (DRM) licence server 320b may include many features which correspond to the features of the portable content server 320a described herein with reference to FIG. 7. The content and DRM licence server 320b may include DRM licence software installed on an encrypted operating system drive of the content and DRM licence server 320b. The content and DRM licence server 320b may include a processor selected according to its ability to support the DRM license server software. For example, the content and DRM licence server 320b may include an Intel processor. The following description of each portable content server 320a may apply equally to the content and DRM licence server 320b.

Each portable content server 320a includes encrypted USB storage devices 342 connected to two of the USB ports 340. Each portable content server 320a includes a USB wired Ethernet network adapter 344 connected to one of the USB ports 340. Each portable content server 320a also includes a USB cellular MODEM 346 such as a USB 3G/4G/LTE adapter connected to one of the USB ports 340. Each portable content server 320a includes one or more sensors for detecting when the aircraft 8 is stationary and/or on the ground to determine whether the cellular modem 346 may be activated. Specifically, each portable content server 320a includes a pressure sensor 345 for sensing barometric pressure which may be indicative of the aircraft's altitude. The processor 330 may calculate vertical speed by converting a rate of change of pressure into a rate of change of altitude. Each portable content server 320a includes a 3-axis accelerometer 346. The accelerometer 346 may measure instantaneous acceleration and the processor 330 may calculate the difference from the current rolling average acceleration in each axis. If the difference in acceleration from the rolling average exceeds a threshold, then the processor 330 determines that the aircraft 8 is moving. Each portable content server 320a further includes a light sensor 347 such as a light sensitive resistor, photocell, photodiode or the like for measuring light levels in the environment in which the portable content server 320a is located. The light sensor 347 may be used to detect light when the portable content server 320a is located in an overhead luggage bin. In this case, the portable content server 320a must be correctly oriented in the luggage bin to detect light when the bin is open. The portable content server 320a may have a fascia which is printed with guidance on the correct orientation, for example "This side facing the cabin", "This way up" and/or the like.

In addition, each portable content server 320a includes a three position switch 348 for use in controlling the cellular modem 346 as will be described below. As shown in FIG. 7, the switch positions may be ON, OFF, AUTO. ON forces the cellular modem 346 to be powered. OFF removes power from the cellular modem 346. When in AUTO mode, the processor 330 analyses data from at least one of the pressure sensor 345, the accelerometer 346 and the light sensor 347 to determine whether the aircraft 8 is on the ground in order to determine whether to provide power to the cellular modem 346.

The processor 330 applies logic to the signals from the sensors 345, 346, 347 to implement a policy for activation of the cellular modem 346. The policy may differ between regulatory regions hence a variable behaviour may be implemented in software to observe/disregard some sensor inputs, and to vary the quantitative threshold values in use. Example policies may be:
Policy A
IF—the altitude is below a first height threshold (e.g. 1500 feet),
    AND—no motion is detected for a first time period (e.g. 120 seconds),
    AND—vertical speed is less than a first vertical speed (e.g. 50 feet per minute),
    ENABLE the modem.
IF motion is detected for a second time period (e.g. 20 seconds or longer),
    DISABLE the modem.
IF the altitude is greater than a second height threshold (e.g. 1600 feet),
    DISABLE the modem.
If vertical speed is greater than a second vertical speed (e.g. 60 feet per minute),
    DISABLE the modem.
Policy B
IF—the altitude is below a first height threshold (e.g. 1000 feet),
    AND—no motion is detected for a first time period (e.g. 300 seconds),
    AND—light is detected,
    ENABLE the modem.
IF motion is detected for a second time period (e.g. 20 seconds or longer),
    DISABLE the modem.
IF the altitude is greater than a second height threshold (e.g. 1100 feet),
    DISABLE the modem.
If no light is detected,
    DISABLE the modem.

The use of asymmetric threshold values builds hysteresis into the activation of the cellular modem 346 to prevent rapid oscillation between the on and off states.

In use, one or more of the servers 320a, 320b may download content by simply replacing one or both of the portable USB storage devices 342 in a manner identical to that already described with reference to the system 2 with reference to FIGS. 1 to 5. With reference to FIG. 6, content may be downloaded and/or updated to the portable USB storage devices 342 by connecting the portable USB storage devices 342 to a content loader device 370 which may be provided to the operator of the system 302 (e.g. the airline or the airport operator). The content loader device 370 may be portable. The content loader device 370 may be located outside, for example remotely from, the local area 6 defined by the aircraft 8. The content loader device 370 may, for example, be located at or near a gate at an airport. The content loader device 370 may be connected via the Internet 372 to one or more cloud content servers 374. The content loader device 370 authenticates to the one or more cloud content servers 374 and securely retrieves encrypted content from the one or more cloud content servers 374 via the Internet 372, for example using an SSL protected web protocol.

Additionally or alternatively, content may be downloaded and/or updated to one or more of the servers 320a, 320b by connecting one or more of the servers 320a, 320b to the content loader device 370 using a wired connection via the wired Ethernet adapter 344. For example, the content loader device 370 may be carried onto the aircraft 8 and connected to one or more of the servers 320a, 320b, or one or more of the servers 320a, 320b may be carried off the aircraft 8 and connected to the content loader device 370.

Additionally or alternatively, the Wi-Fi access point 324 of one or more of the servers 320a, 320b may be used to communicate wirelessly with the content loader device 370 for the purposes of downloading and/or updating content wirelessly to one or more of the servers 320a, 320b.

Additionally or alternatively, when the cellular modem 346 is enabled, the cellular modem 346 of one or more of the servers 320a, 320b may connect to the cloud content server 374 via a cellular network 376 to download content items and/or updates. One or more of the servers 320a, 320b may authenticate to the cloud content server 374 via the cellular network 376. One or more of the servers 320a, 320b may securely download encrypted content items from the cloud content server 374 using a secure protocol when the aircraft 8 is within range of the cellular network 376.

Each server 320 may store the same content. Content downloaded wirelessly from the content loader device 370 or the cellular network 376 to one of the servers 320 may be distributed to the other servers 320 via the wireless mesh network in order to synchronise the content across all of the servers 320. This may be particularly advantageous when it is necessary to download or update the content in a short period of time, for example during a turnaround between flights.

In most aircraft deployment scenarios there will be several servers 320 in the cabin 6. The servers 320 may form a cluster to collectively download the content. Each server 320 may download the next content file in a queue of content files until all content files are downloaded to the cluster. The content files are then shared between the servers 320 in the cabin 6 until all the servers 320 have received the downloaded content files. This allows for faster downloads as it avoids any requirement to download the same content files to all the servers 320 in the same aircraft 8.

As described above, one or more of the servers 320 can receive content updates by insertion of physical media or over a network connection. The network connection may be achieved using wired Ethernet, Wi-Fi (802.11), or by 3G/4G/LTE cellular modem connection. These connections have varying speeds and associated transport costs. 3G/4G/LTE cellular traffic typically has a cost per megabyte, whereas a broadband Ethernet or Wi-Fi connection is a fixed cost. This creates a problem in that there may be content items that are to be sent to one or more of the servers 320 in the field, but will incur a large cost if sent by the cellular modem 346. To resolve this, the processor 330 implements a routing policy whereby content items (files, data, images etc) or classes of content or data (e.g. movies, TV, magazines, newspapers) can have a policy applied which determines the permissible transport routes for that item or class of item. For instance, a movie item is a large file that changes infrequently and is reserved for physical transport distribution. A weekly news show is a large file that changes weekly, and is permitted for wireless update to one or more of the servers 320. A daily newspaper is a smaller file that changes daily, and is permitted for cellular update to one or more of the servers 320.

Where large content files are downloaded over a slow communication link, the transfer time may exceed the length of time for which the communication link is available. For example, this may occur when the system is in range of a wireless connection only while the aircraft 8 is located at a gate during a turnaround period between flights. In such a case, the system 302 may pause the transfer when the communication link is lost, and then resume the transfer from that point, when the communication link is re-established.

Figure 8:
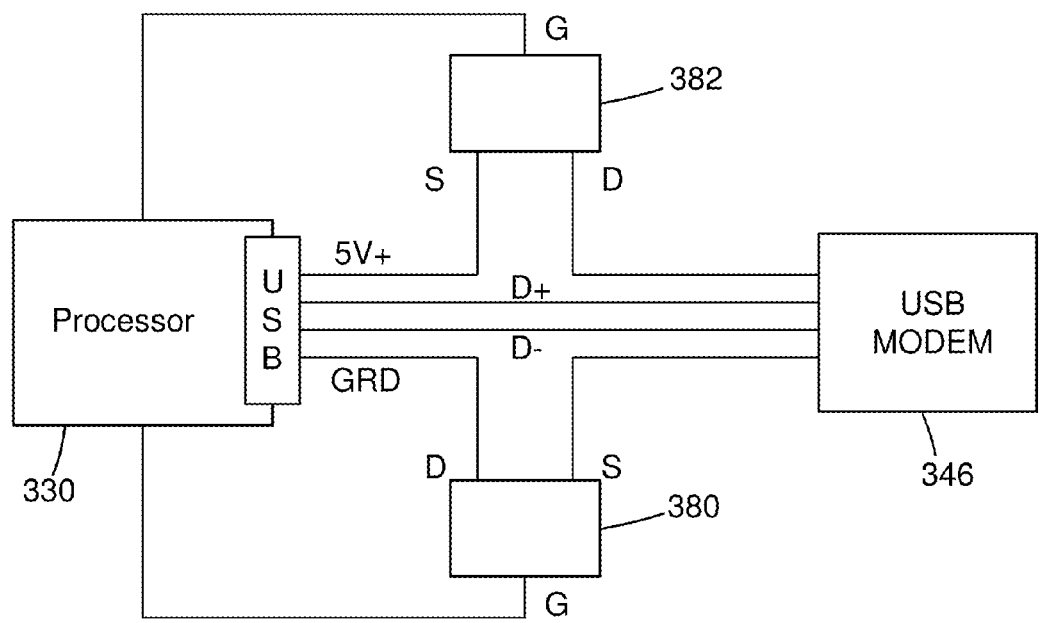
FIG. 8 is a schematic of the power connections between a processor and a USB cellular modem of a server of the alternative system of FIG. 6.

As shown in FIG. 8, the server 320a may comprise a 5V USB power connection between the processor 330 and the cellular modem 346. The 5V USB power connection may comprise a +5V line and a ground line. The ground line may have an inline switch such as a first inline MOSFET 380. The inline switch may control current flow on the ground line. The processor 330 may use a GPIO pin output to control the power to the cellular modem 346. The GPIO may provide a voltage to a control terminal of the inline switch e.g. a positive voltage on a gate pin designated "G" of the first inline MOSFET 380. This may allow current to flow through the inline switch e.g. from source designated "S" to the drain designated "D" of the first inline MOSFET 380 to enable the cellular modem 346. An equivalent arrangement involving a second inline MOSFET 382 may be used on the +5V line. The use of two such arrangements may provide redundancy to ensure that in certain failure conditions the cellular modem 346 will not activate while uncommanded, e.g. where there is a short-circuit that enables an alternative circuit or ground, bypassing the ground line inline MOSFET 380.

When the cellular modem 346 is active, one or more of the servers 320 can determine Local Area Code and Cell ID of the local cell tower. The processor 330 of may use this information to lookup geolocation information for the server 320 to give an approximate location, without GPS.

Figure 9:
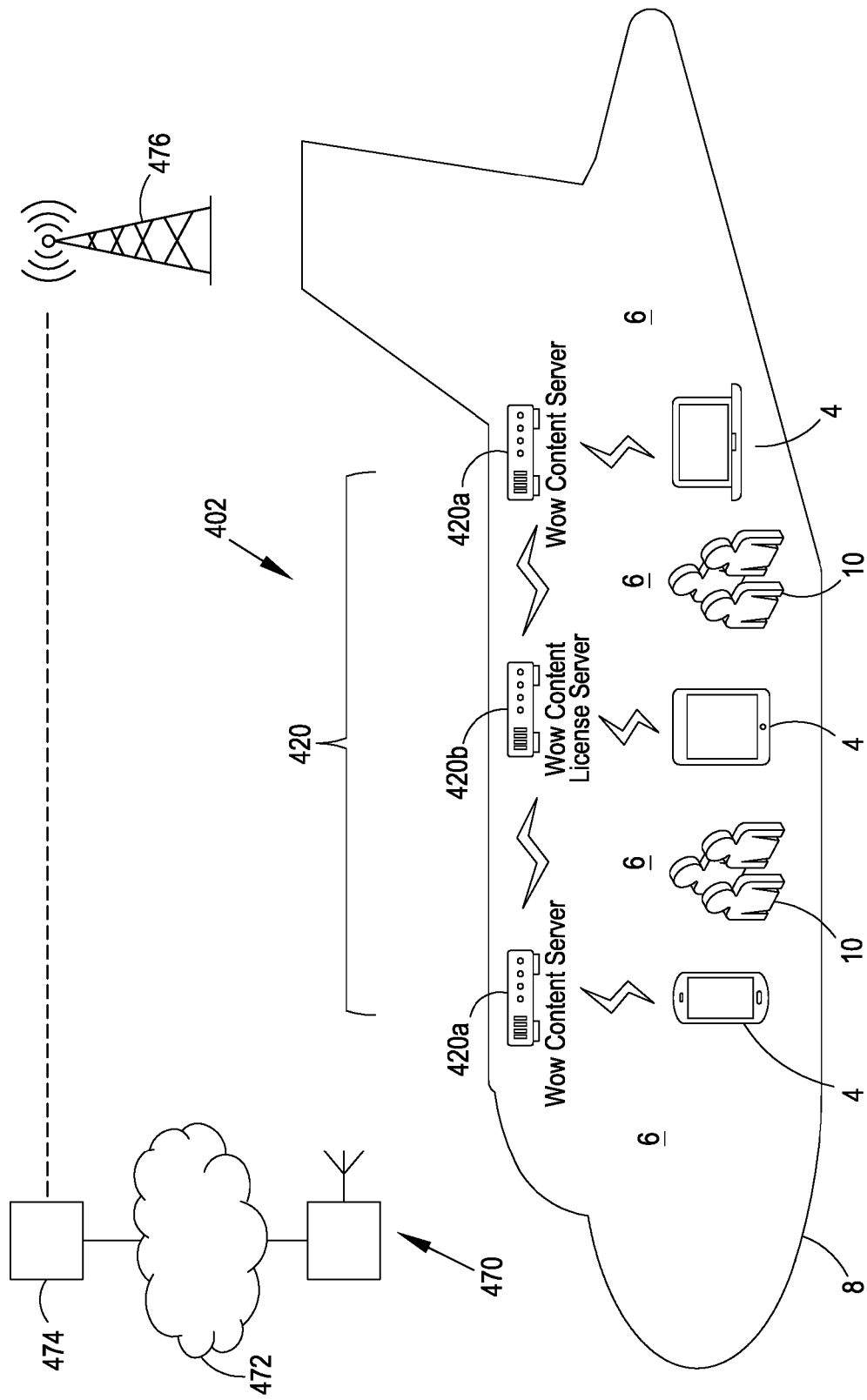
FIG. 9 is a schematic of a further alternative system for wirelessly distributing content including advertising content to a plurality of clients in a cabin of an aircraft.

FIG. 9 shows a further alternative system 402 for wirelessly distributing content including advertising content to a plurality of clients in the form of a plurality of mobile devices 4 in a local area in the form of a cabin 6 of an aircraft 8. As will be described in more detail below, the further alternative system 402 is also configured for collecting user data such as user viewing data, user click-through data, user names, user contact details and the like from the plurality of mobile devices 4. The further alternative system 402 of FIG. 9 includes many like features to the alternative system 302 described with reference to FIGS. 6 to 8 with the features of the further alternative system 402 of FIG. 9 being identified with the same reference numerals as the corresponding features of the alternative system 302 of FIGS. 6 to 8 incremented by "100". Specifically, the further alternative system 402 includes a plurality of portable servers 420, in the form of a plurality of portable content servers 420a and one or more portable content and Digital Rights Management (DRM) licence servers 420*b*. Each portable server 420 is arranged around the cabin 6 of the aircraft 8 for wireless communication with one or more corresponding mobile devices 4. Each portable server 420 is also arranged around the cabin 6 so as to permit wireless communication with at least one of the other portable servers 420 so that, on power up of the portable servers 420, the portable servers 420 together form a wireless mesh network within the cabin 6.

Figure 10:
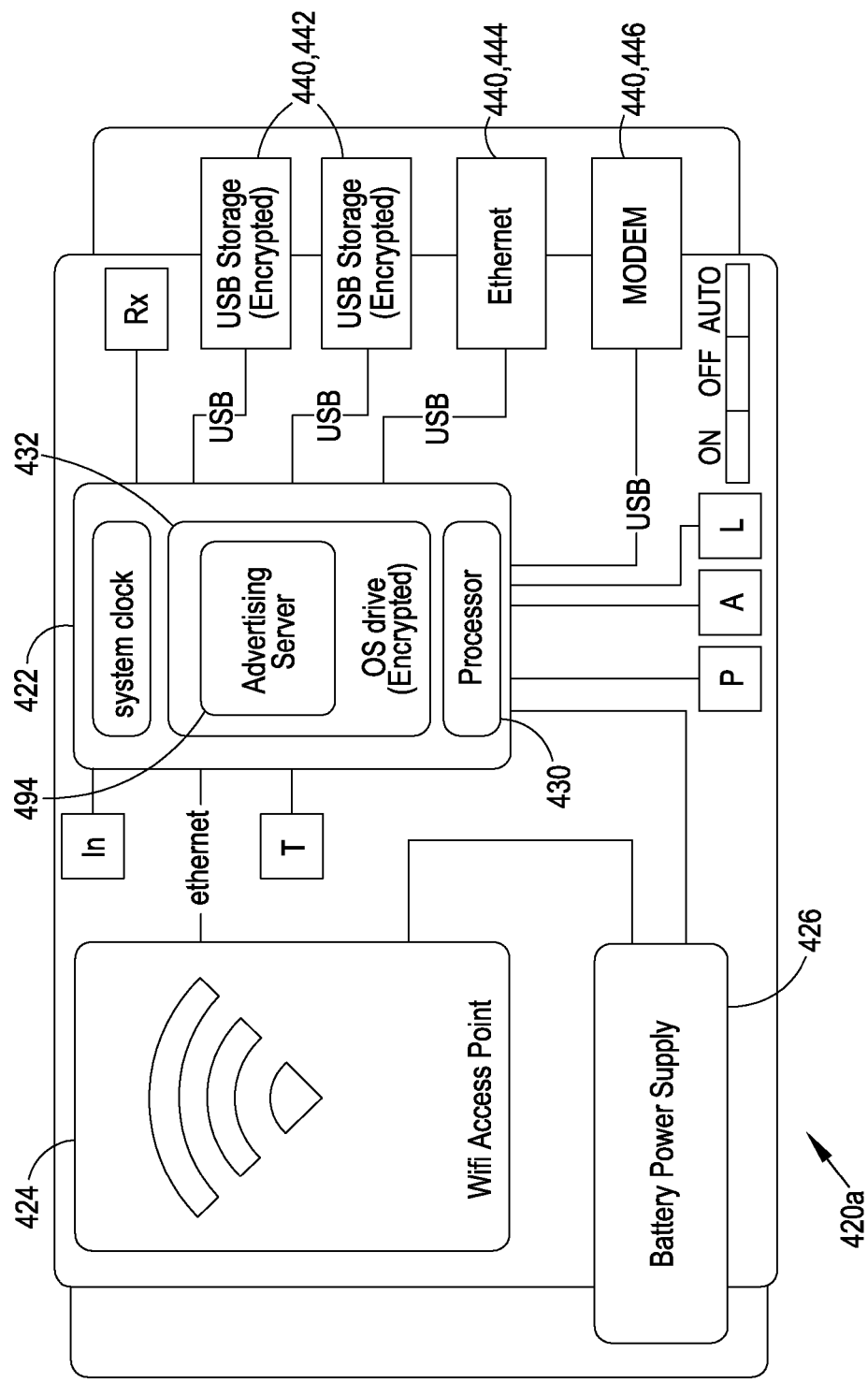
FIG. 10 is a functional block diagram of a portable content server of the further alternative system of FIG. 9.

As shown in FIG. 10, each portable content server 420*a* includes many like features to the portable content server 320*a* described with reference to FIG. 7 with the features of the portable content server 420*a* of FIG. 10 being identified with the same reference numerals as the corresponding features of the portable content server 320*a* described with reference to FIG. 7 incremented by "100". Specifically, each portable content server 420*a* includes a single board computer 422, a wireless transceiver in the form of a Wi-Fi access point 424, and a battery 426 for supplying power to the single board computer 422 and the Wi-Fi access point 424. The single board computer 422 includes a processor 430 and an encrypted operating system drive 432 for storing operating system software. The processor 430 may have a relatively low power consumption for longer battery life. For example, the processor 430 may be an ARM processor. Each portable content server 420*a* further includes a plurality of USB ports 440. Each portable content server 420*a* includes encrypted USB storage devices 442 connected to two of the USB ports 440. Each portable content server 420*a* includes a USB wired Ethernet network adapter 444 connected to one of the USB ports 440. Each portable content server 420*a* also includes a USB cellular MODEM 446 such as a USB 3G/4G/LTE adapter connected to one of the USB ports 440.

However, unlike the portable content server 320*a* described with reference to FIG. 7, the portable content server 420*a* of FIG. 10 includes advertising server software 494 installed on the encrypted operating system drive 432 of the portable content server 420*a* so that the portable content server 420*a* may function as an advertising server as will be described in more detail below.

In use, one or more of the servers 420*a*, 420*b* may download content by simply replacing one or more of the portable USB storage devices 442 in a manner identical to that already described with reference to the system 2 with reference to FIGS. 1 to 5. With reference to FIG. 9, content may be downloaded and/or updated to the portable USB storage devices 442 by connecting the portable USB storage devices 442 to a content loader device 470 which may be provided to the operator of the system 402 (e.g. the airline or the airport operator). The content loader device 470 may be portable. The content loader device 470 may be located outside, for example remotely from, the local area 6 defined by the aircraft 8. The content loader device 470 may, for example, be located at or near a gate at an airport. The content loader device 470 may be connected via the internet 472 to one or more cloud content servers 474. The content loader device 470 authenticates to the one or more cloud content servers 474 and securely retrieves encrypted content from the one or more cloud content servers 474 via the internet 472, for example using an SSL protected web protocol.

Additionally or alternatively, content may be downloaded and/or updated to one or more of the servers 420*a*, 420*b* by connecting one or more of the servers 420*a*, 420*b* to the content loader device 470 using a wired connection via the wired Ethernet adapter 444. For example, the content loader device 470 may be carried onto the aircraft 8 and connected to one or more of the servers 420*a*, 420*b*, or one or more of the servers 420*a*, 420*b* may be carried off the aircraft 8 and connected to the content loader device 470.

Additionally or alternatively, the Wi-Fi access point 424 of one or more of the servers 420*a*, 420*b* may be used to communicate wirelessly with the content loader device 470 for the purposes of downloading and/or updating content wirelessly to one or more of the servers 420*a*, 420*b*.

Additionally or alternatively, when the cellular modem 446 is enabled, the cellular modem 446 of one or more of the servers 420*a*, 420*b* may connect to the cloud content server 474 via a cellular network 476 to download content items and/or updates. One or more of the servers 420*a*, 420*b* may authenticate to the cloud content server 474 via the cellular network 476. One or more of the servers 420*a*, 420*b* may securely download encrypted content items from the cloud content server 474 using a secure protocol when the aircraft 8 is within range of the cellular network 476.

One of ordinary skill in the art will understand that the portable content and Digital Rights Management (DRM) licence server 420*b* may include many features which correspond to the features of the portable content server 420*a* described herein with reference to FIG. 10. The content and DRM licence server 420*b* may include DRM licence software installed on an encrypted operating system drive of the content and DRM licence server 420*b*. The content and DRM licence server 420*b* may include a processor selected according to its ability to support the DRM license server software. For example, the content and DRM licence server 420*b* may include an Intel processor.

The portable servers 420*a*, 420*b* together define a portable system 402 for wirelessly distributing advertising content to the plurality of clients in the cabin 6. Each portable server 420*a*, 420*b* is configured for wireless communication with one or more corresponding clients 4 so that the portable system 402 may distribute advertising content to the plurality of clients 4 in the cabin 6.

The portable system 402 is configured for occasional connection to the internet.

The portable system 402 is configured to deliver advertising content to the plurality of clients 4 when the portable system 402 has no connection, or no access, to the internet. The portable system 402 is configured to allow the advertising content to be updated and/or changed when the portable system 402 has a connection, or access, to the internet.

As described above, one or more of the portable servers 420*a*, 420*b* may function as an advertising server. One or more of the portable servers 420*a*, 420*b* may function as an advertising server when the portable server 420*a*, 420*b* is not connected to the internet, for example, when inflight. Such advertising server functionality may be compliant with current web advertising standards, but will function in a distributed and offline model, where one or more of the portable servers 420*a*, 420*b* act as nodes which communicate with one or more clients 4 offline, but where one or more of the portable servers 420*a*, 420*b* send data back to a master server provided with the cloud content server 474 when one or more of the portable servers 420*a*, 420*b* get online. The master server collates the data received from one or more of the portable servers 420*a*, 420*b* to present a unified view of the received data to mirror behaviour of an online system.

One or more of the portable servers 420*a*, 420*b* may be configured for occasional communication with an advertising admin portal provided with the content loader device 470 and/or the cloud content server 474. The advertising admin portal may be a hosted service.

One or more of the portable servers 420a, 420b may be configured for communication with the advertising admin portal when a connection is available, for example via a portable storage device 442, via a wired connection such as a wired Ethernet connection, and/or via a wireless connection such as a Wi-Fi (802.11) or a 3G/4G cellular modem connection.

One or more of the portable servers 420a, 420b may be configured for communication with the advertising admin portal to receive updates, advertising creatives, images, video, HTML and other advertising content, campaign details and/or dates etc.

One or more of the portable servers 420a, 420b may be configured for communication with one or more of the clients 4 to provide advertising content to one or more of the clients 4. For example, one or more of the portable servers 420a, 420b may be configured for communication with one or more of the clients 4 so that one or more of the clients 4 display one or more banner advertising images or banner adverts. One or more of the clients 4 may be configured to display a web page when a corresponding user 10 clicks on a banner advert.

One or more of the portable servers 420a, 420b may be configured to communicate video adverts to one or more of the clients 4 for display to the one or more corresponding users 10 before, during and/or after each user 10 views an item of video content e.g. a movie or a TV show.

One or more of the portable servers 420a, 420b may be configured to collect user data from the clients 4.

One or more of the portable servers 420a, 420b may be configured to collect from the clients 4, the number of users 10 that have seen an advert such as a banner advert or a video advert and the number of user "click-throughs".

One or more of the portable servers 420a, 420b may be configured to collect user names, user contact details such as user email addresses and the like.

One or more of the portable servers 420a, 420b may be configured to connect to the advertising admin portal when a connection is available to upload user data such as user view and click-through data, user names, user contact details and any other user data collected during the period when the portable server was not connected to the advertising admin portal. This way, the system 402 may allow online configuration of advertising campaigns, and the portable servers 420a, 420b will sync with the advertising admin portal whenever the portable servers 420a, 420b are online, but will cache the campaign data when they are offline to enable the system 402 to function when no connection is available e.g. when inflight.

The advertising admin portal may collect data from all the portable servers 420a, 420b when they connect to the advertising admin portal. The advertising admin portal may then collate the collected data to allow campaign information and statistics to be made available to the portal users e.g. the number of portable servers, aircraft, and flights on which an advert was displayed, the number of users that viewed the advert, the number of clicks on the advert, and the click-through percentage rate.

The portable servers 420a, 420b may be compliant with the VAST (Video Ad Serving Template) specification provided by the Interactive Advertising Bureau (IAB). This enables the portable servers 420a, 420b to consume and serve the same creative and participate in the same campaigns as standard web advertising e.g. Google ads. As such, the system 402 can comply with these standards, which are designed for an online environment, even though the web advertising is deployed in an offline environment which is only sometimes connected to the internet.

One of ordinary skill in the art will understand that various modifications may be made to the systems 2, 302 described above. For example, the system may also be capable of receiving information or data which is transmitted or broadcast from the aircraft 8, for example from one or more of the aircraft systems.

One or more of the servers 20, 320 may provide "moving map" information. This may allow a user 10 to view a map showing the current position of the aircraft 8 and other journey information (e.g. flight information such as altitude, ETA etc.). To facilitate this, one or more of the servers 20, 320 may include a UHF radio receiver 88, 388 to monitor for position broadcasts sent by the aircraft 8 for air traffic control purposes. These are known as ADS-B-out (Automatic Dependent Surveillance—Broadcast out) transmissions. The messages may contain position, ICAO callsign (hex), altitude, flight number, and other data. The processor 30, 330 may parse the received position broadcasts to determine current flight information for display on a moving map at the one or more clients 4.

Monitoring position broadcasts sent by the aircraft 8 may avoid any requirement to modify the aircraft systems. In addition, monitoring position broadcasts sent by the aircraft 8 in this way does not require any of the servers to be compatible with any particular type of aircraft system. Monitoring position broadcasts sent by the aircraft 8 in this way does not require any of the servers to transmit, write or send commands to an aircraft system. Consequently, the servers 20, 320 are not capable of transmitting, writing or sending commands to the aircraft system and are not, therefore, capable of controlling an aircraft system. Also, monitoring position broadcasts sent by the aircraft 8 in this way may avoid any requirement to use a GPS receiver located inside one or more of the servers. This may be advantageous because a GPS receiver located inside a server 20, 320 may not receive sufficient signal to establish a fix.

The ADS-B is a broadcast signal and messages may be received from other aircraft in the vicinity of the aircraft 8. Thus, the processor 30, 330 of one or more of the servers 20, 320 may apply logic to the received data in order to determine if it is from the aircraft 8 on which the server 20, 320 is installed.

The antenna gain of the UHF radio receiver 88, 388 may be reduced to the lowest level at which signals can be received from the aircraft 8. This is to reduce chatter from nearby aircraft. One or more of the servers 20, 320 may store a callsign whitelist which contains the ICAO callsigns of each aircraft on which it may be installed. One or more of the servers 20, 320 may use the whitelist to filter received data and discard any position information from aircraft not on the whitelist.

Where there is a conflict, i.e. data is received from two or more aircraft on the whitelist at the same time, the processor 30, 330 of one or more of the servers 20, 320 may analyse the number of messages received from each aircraft, and select the aircraft which has sent the most messages as the installed aircraft. Where there is not a clear preference from the count, the system 2, 302 will not display information at one or more of the clients 4 that may be incorrect, e.g. where there are two possible flight numbers.

Additionally or alternatively, one or more of the servers 20, 320 may comprise a GPS receiver (not shown). The GPS receiver (not shown) does not receive a signal in the cabin during flight, but may be used on the ground for tracking, so that the system 2, 302 can report its location the next time it has a network connection.

The system 2, 302 may be capable of transmitting information from the aircraft system to one or more of the clients 4. The system 2, 302 may be capable of broadcasting information to the plurality of clients 4. For example, one or more of the servers 2, 320 may include an audio signal input 90, 390 for receiving an audio signal from the aircraft 8. The audio signal input 90, 390 is connected to the cabin intercom system headphone or line-out audio jack. The processor 30, 330 monitors the audio signal level and determine when an announcement is in progress during a flight. The processor 30, 330 smoothes the audio signal level to provide a reliable audio signal measurement. The processor 30, 330 uses an audio signal level threshold to determine when an announcement is in progress. When the processor 30, 330 determines that an announcement is in progress, each server 20, 320 sends a command to the one or more corresponding clients 4 on the network to pause playback of content and request that the user 10 pays attention to the cabin announcement. When the announcement ends, the audio signal drops below the threshold level and this is detected by the processor 30, 330. Each server 20, 320 then sends a command to the clients 4 in the cabin 6 to resume playback of content.

One or more of the servers 20, 320 may have a physical control or button on the exterior (not shown) to provide a manual signal that an announcement is in progress. In response to a button press on any one of the servers 20, 320, the server 20, 320 concerned transmits a signal over the mesh network to all the other servers 20, 320, playback is interrupted at all of the clients 4 on the network and each user 10 is informed that an announcement is in progress by way of a visual and/or audio message via the corresponding client 4.

One or more of the servers 20, 320 may have a network interface (not shown) and an API command to allow a crew device and/or a crew app to provide the manual signal that an announcement is in progress. One or more of the servers 20, 320 may provide an API so that a crew device such as a mobile or tablet (not shown) can communicate with the one or more servers to provide administrator control and information. The API may use the mesh network between the servers 20, 320 to support usage across the cabin.

One or more of the servers 20, 320 may be configured to allow any of the clients to communicate with the crew device so that the crew device (not shown) may receive a notification when a passenger makes a request. The message can include information about the request, e.g. a food or duty free order, with a list of items and cost. The crew device (not shown) may be a $3^{rd}$ party Point of Sale device. In this case the system API can automate the message delivery to the PoS device with the transaction details and costs. The API may allow the PoS device to take the payment and then provide an authorisation code back to the system 2, 302 to confirm or reject the payment.

One or more of the servers 20, 320 may provide a messaging feature to connected client devices 4. This may be used for crew announcements, and also for passenger chatroom or seat-to-seat messaging. The messaging feature may use the mesh network to route messages between the servers 20, 320 so that e.g. passengers at the front of the aircraft who are connected to one server 20, 320 can communicate with passengers at the rear of the aircraft who are connected to a different server 20, 320.

One or more of the servers 20, 320 may comprise a temperature sensor 92, 392 for sensing a temperature of the server 20, 320. If the temperature sensed by the temperature sensor exceeds a threshold, then the power supply 326 is disconnected from the single board computer 322 and the W-Fi access point 324.

The power supply 326 may provide both a 5V and a 12V power output. This may support different power requirements for the internal components.

One or more of the servers 20, 320 may have air vents to allow air circulation without the need for a fan.

One or more of the servers 20, 320 may be constructed from a fire retardant material to comply with air safety regulations.

One or more of the servers 20, 320 may incorporate removable side and end panels as separate components. This may allow the panels to be manufactured in airline colours, without remanufacturing the main body components.

One or more of the servers 20, 320 may have feet on the bottom and/or the top. The feet may provide friction and prevent sliding when the server 20, 320 is installed in the aircraft. The feet may be on the bottom and the top of the server 20, 320 so that it can be orientated in either direction.

The local area may be a defined space or region other than an aircraft and the clients may be located within the defined space or region. For example, the local area may be defined by or within a building and the clients may be located in, around or adjacent to the building. The local area may be defined by or within one or more spaces or rooms of a building and the clients may be located in, around or adjacent to the one or more spaces or rooms. The local area may be defined by or within a vehicle of any kind and the clients may be located in or on the vehicle. The users may be passengers located in or on the vehicle.

One or more of the clients may be a personal computer (PC) or a computing device of any kind.

In some embodiments, rather than combining the content and DRM licence server functionality in a single content and DRM licence server 20*b*, 320*b*, the content server functionality may be provided in a content server and the DRM licence server functionality may be provided in a DRM licence server which is physically separate from the content server.

Embodiments have been described above purely by way of example and it will be understood that details of the embodiments may be varied whilst still falling within the scope of the appended claims.

The invention claimed is:

1. A portable server for use in a system for wirelessly distributing content to a plurality of clients in a local area which is defined by or within an aircraft, wherein the portable server comprises:
   storage for storing content;
   a wireless transceiver for wireless communication with one or more of the clients for wireless distribution of at least some of the stored content to one or more of the clients and for wireless communication with at least one other portable server;
   a processing resource for controlling the wireless transceiver for wireless distribution of content to one or more of the clients and for wireless communication with the at least one other portable server; and
   a wireless UHF radio receiver for wirelessly receiving ADS-B-out (Automatic Dependent Surveillance-Broadcast out) transmissions from the aircraft,
   wherein the processing resource is configured to determine current flight information from the ADS-B-out transmissions wirelessly received by the radio receiver and to send the current flight information to the wireless transceiver for wireless transmission to one or more of the clients for display on a moving map at the one or more of the clients.

2. The portable server of claim 1, wherein the portable server is configured to deliver content to the plurality of clients when the portable system has no connection, or no access, to the internet.

3. The portable server of claim 1, wherein
the portable server is configured to operate independently of any existing systems or infrastructure in the local area in which the system is installed.

4. The portable server of claim 1, wherein the content comprises at least one of:
visual content including video content and/or web content;
audio content;
entertainment content;
a movie and/or a TV program;
music;
audiobooks;
eMagazines;
news;
games including HTML5 games;
information relating to shopping services;
maps including moving maps;
information relating to flights, destination information and airport information;
food and/or drinks orders;
information relating to merchandise; or
advertising content.

5. The portable server of claim 1, wherein at least one of:
(a) each client comprises a mobile device associated with and/or operated by a corresponding user and wherein each client includes software to permit the user to communicate with, and select content stored on, the portable server and to permit the user to view and/or listen to the content;
b) the wireless transceiver comprises a Wi-Fi access point which is operable so as to provide a Wi-Fi cell for wireless communication with the one or more corresponding clients in the Wi-Fi cell;
c) the portable server is configured to provide content wirelessly to the one or more corresponding clients in response to a request from the one or more corresponding clients;
d) the portable server is configured to authenticate each of the one or more corresponding clients using an appropriate mechanism in order to control access to the content stored in the portable server; or
e) comprises DRM licence server software for controlling access to the content stored in the portable server.

6. The portable server of claim 1, wherein at least one of:
a) the portable server comprises an interface or a slot configured to receive content from one or more portable storage devices;
b) the portable server comprises an interface for connection to a content loader device using a wired connection;
c) the portable server is connectable to a secure content loading wireless Wi-Fi (IEEE 802.11) network for downloading content from a content loader device; or
d) the portable server is configured for downloading content from a content loader device via a Wi-Fi access point.

7. The portable server of claim 1, comprising a cellular modem for downloading content over a cellular network.

8. The portable server of claim 7, wherein the portable server comprises a sensor resource comprising at least one sensor, and wherein the processing resource is configured to receive one or more sensor signals from the sensor resource and to determine, in dependence on the one or more sensor signals, when the aircraft is below a threshold altitude, when the aircraft is substantially stationary, and/or when the aircraft is on the ground, and to control the supply of power to the modem in response to determining that the aircraft is below the threshold altitude, the aircraft is substantially stationary, and/or the aircraft is on the ground.

9. The portable server of claim 8, wherein the sensor resource comprises at least one of:
a pressure sensor for sensing barometric pressure in a cabin of the aircraft;
a motion sensor for sensing motion and/or acceleration of the aircraft; or
an optical sensor or light sensor for measuring light levels in an environment in which the portable server is located.

10. The portable server of claim 9, wherein the portable server is configured to determine a Local Area Code and/or Cell ID of a local cell tower when the modem is active.

11. The portable server of claim 1, wherein the portable server is configured to receive an audio signal input from an aircraft, monitor a level of the audio signal, to determine when an announcement is in progress during a flight, to send a command to the one or more corresponding clients on the network to pause playback of content and request that the user pays attention to the cabin announcement, and to send a command to the one or more corresponding clients to resume playback of content when the announcement ends.

12. The portable server of claim 1, wherein at least one of:
a) the portable server provides an API so that a crew device can communicate with the portable server to provide administrator control and information;
b) the portable server is configured to allow any of the clients to communicate with a crew device so that the crew device may receive a notification when a passenger makes a request;
c) the portable server comprises PCI-DSS compliant software for capturing and storing payment data;
d) the portable server is configured to store transaction data for later offload when connectivity is available; or
e) the portable server is configured to provide a messaging feature to connected client devices to enable crew announcements and/or for passenger chatroom or seat-to-seat messaging.

13. The portable server of claim 1, wherein at least one of:
a) the portable server comprises a power supply;
b) the portable server comprises a rechargeable battery;
c) the portable server comprises a removable power supply; or
d) the portable server is configured so that 12V power can be used to power the portable server directly when there is no battery present.

14. The portable server of claim 1, wherein at least one of:
a) the portable server is configured to remember recent items that a user of a client has viewed and, on subsequent user login, to present the same items to the user for continued viewing; or
b) the portable server is configured for communication with one or more of the clients to provide advertising content to one or more of the clients when the portable server is not connected to the internet.

15. The portable server of claim 1, wherein at least one of:
a) the portable server is configured to collect user data from one or more of the clients;
b) the portable server is configured to collect user data from one or more of the clients and the user data comprises at least one of:
the number of users that have seen an advert,
the number of user "click-throughs",
user names, or
user contact details;
c) the portable server is configured to connect to an advertising admin portal when a connection is available to upload the user data collected during the period when the portable server is not connected to the advertising admin portal; or
d) the portable server comprises advertising server software which is compliant with the VAST (Video Ad Serving Template) specification provided by the Interactive Advertising Bureau (IAB).

16. A system for wirelessly distributing content to a plurality of clients in a local area defined by or within an aircraft, the system comprising a plurality of portable servers, wherein each portable server comprises:
storage for storing content;
a wireless transceiver for wireless communication with one or more corresponding clients of the plurality of clients for wireless distribution of at least some of the stored content to the one or more corresponding clients and for wireless communication with at least one of the other portable servers;
a processing resource for controlling the wireless transceiver for wireless distribution of content to the one or more corresponding clients and for wireless communication with at least one of the other portable servers; and
a wireless UHF radio receiver for wirelessly receiving ADS-B-out (Automatic Dependent Surveillance-Broadcast out) transmissions from the aircraft,
wherein the processing resource is configured to determine current flight information from the ADS-B-out transmissions wirelessly received by the radio receiver and to send the current flight information to the wireless transceiver for wireless transmission to one or more of the clients for display on a moving map at the one or more of the clients.

17. The system of claim 16, wherein:
the portable servers include one or more portable content servers and one or more portable DRM licence servers;
each content server is configured to receive a request for a content item from a client;
in response to receipt of the request for the content item, the content server requests a licence from a DRM licence server;
in response to receipt of the licence request, the DRM licence server provides an encryption key to the content server; and
the content server provides the encryption key to the client which requested the content item together with the encrypted content so that the client may decrypt the encrypted content using the encryption key.

18. The system of claim 17, wherein at least one of:
a) the portable servers include one or more portable content servers and one or more portable DRM licence servers, and each DRM licence server is configured to authenticate a client using an appropriate mechanism in order to control access to encrypted content stored in a content server;
b) one or more of the portable servers is configured for occasional connection to the internet to allow the stored content to be updated and/or changed; or
c) one or more of the portable servers is configured to select and download a different portion of a total content to be downloaded and to share the downloaded portion of the content with each of the other portable servers.

19. A method for wirelessly distributing content to a plurality of clients in a local area which is defined by or within an aircraft, the method comprising:
providing a plurality of portable servers, each portable server comprising:
storage for storing content;
a wireless transceiver for wireless communication with one or more corresponding clients of the plurality of clients for wireless distribution of at least some of the stored content to the one or more corresponding clients and for wireless communication with at least one of the other portable servers;
a processing resource for controlling the wireless transceiver for wireless distribution of content to the one or more corresponding clients and for wireless communication with at least one of the other portable servers; and
a wireless UHF radio receiver for wirelessly receiving ADS-B-out (Automatic Dependent Surveillance-Broadcast out) transmissions from the aircraft,
wherein the processing resource is configured to determine current flight information from the ADS-B-out transmissions wirelessly received by the radio receiver and to send the current flight information to the wireless transceiver for wireless transmission to one or more of the clients for display on a moving map at the one or more of the clients; and
arranging the portable servers in the local area to allow each portable server to communicate wirelessly with the one or more corresponding clients for wireless distribution of at least some of the stored content to the one or more corresponding clients, and to allow each portable server to communicate wirelessly with at least one of the other portable servers.

* * * * *